US012658084B2

(12) United States Patent
Xie

(10) Patent No.: US 12,658,084 B2
(45) Date of Patent: Jun. 16, 2026

(54) DETECTION METHOD FOR ACTIVE MATRIX ORGANIC LIGHT EMITTING DIODE DISPLAY IMPROVING ACCURACY OF DETECTING DATA VOLTAGE OF TARGET COLOR PIXEL CIRCUITS IN TARGET PIXEL COLUMN

(71) Applicant: Yungu (Gu'an) Technology Co., Ltd., Langfang (CN)

(72) Inventor: Hongjun Xie, Langfang (CN)

(73) Assignee: Yungu (Gu'an) Technology Co., Ltd., Langfang (CN)

( * ) Notice: Subject to any disclaimer, the term of this patent is extended or adjusted under 35 U.S.C. 154(b) by 0 days.

(21) Appl. No.: 19/015,537

(22) Filed: Jan. 9, 2025

(65) Prior Publication Data

US 2025/0252879 A1 Aug. 7, 2025

(30) Foreign Application Priority Data

Feb. 4, 2024 (CN) ......................... 202410159958.9

(51) Int. Cl.
*G09G 3/3233* (2016.01)
*G09G 3/00* (2006.01)

(52) U.S. Cl.
CPC ........... *G09G 3/006* (2013.01); *G09G 3/3233* (2013.01); *G09G 2300/0819* (2013.01);
(Continued)

(58) Field of Classification Search
CPC .......... G09G 3/30; G09G 3/32; G09G 3/3208; G09G 3/3216; G09G 3/3225;
(Continued)

(56) References Cited

U.S. PATENT DOCUMENTS

2011/0216056 A1* 9/2011 Yoo .......................... G09G 3/32 345/212
2012/0206049 A1* 8/2012 Han ....................... H10K 59/13 313/504
(Continued)

FOREIGN PATENT DOCUMENTS

CN 106297665 A 1/2017
CN 106782320 A 5/2017
(Continued)

OTHER PUBLICATIONS

Chinese Patent Office, First Office Action issued in Chinese Patent Application No. 202410159958.9 dated Apr. 29, 2026.

*Primary Examiner* — Ke Xiao
*Assistant Examiner* — Nelson Lam
(74) *Attorney, Agent, or Firm* — Kilpatrick Townsend & Stockton LLP

(57) ABSTRACT

The application relates to a detection method and a debugging method for a display panel, and a display panel. The method includes: obtaining a first node voltage and a second node voltage corresponding to target color pixel circuits in a target pixel column; adjusting, based on the first node voltage and the second node voltage, a data voltage inputted to each target color pixel circuit in the target pixel column, so that preset voltages of a plurality of target color pixel circuits are the same, where the preset voltage is a difference between the data voltage inputted to the target color pixel circuit and a voltage at a connection node between the target color pixel circuit and a detection signal line; and detecting the plurality of target color pixel circuits in the target pixel column, to obtain detected data of each target color pixel circuit.

16 Claims, 16 Drawing Sheets

(52) U.S. Cl.
CPC ............... *G09G 2300/0842* (2013.01); *G09G 2310/066* (2013.01); *G09G 2320/0285* (2013.01); *G09G 2320/045* (2013.01)

(58) Field of Classification Search
CPC .... G09G 3/3233; G09G 3/3241; G09G 3/325; G09G 3/3258; G09G 3/3266; G09G 3/3275; G09G 3/3283; G09G 3/3291
USPC ...................................................... 345/76–83
See application file for complete search history.

(56) References Cited

U.S. PATENT DOCUMENTS

2015/0294620 A1* 10/2015 Cho ..................... G09G 3/3233
345/77
2016/0104422 A1* 4/2016 Kishi ..................... G09G 3/006
345/205

FOREIGN PATENT DOCUMENTS

| | | | |
|---|---|---|---|
| CN | 109243374 | A | 1/2019 |
| CN | 109872695 | A | 6/2019 |
| CN | 110956928 | A | 4/2020 |
| CN | 112527591 | A | 3/2021 |
| CN | 112578328 | A | 3/2021 |
| CN | 213366093 | U | 6/2021 |
| KR | 20200079964 | A | 7/2020 |

* cited by examiner

DETECTION METHOD FOR ACTIVE MATRIX ORGANIC LIGHT EMITTING DIODE DISPLAY IMPROVING ACCURACY OF DETECTING DATA VOLTAGE OF TARGET COLOR PIXEL CIRCUITS IN TARGET PIXEL COLUMN

CROSS REFERENCE TO RELATED APPLICATIONS

The present application claims priority to Chinese Patent Application No. 202410159958.9 filed on Feb. 4, 2024, and entitled "DETECTION METHOD AND DEBUGGING METHOD FOR DISPLAY PANEL, DISPLAY PANEL, AND DETECTION APPARATUS", which is incorporated herein by reference in its entirety.

TECHNICAL FIELD

The present application relates to the field of display technologies, and in particular, to a detection method and a debugging method for a display panel, a display panel, a detection apparatus, a computer device, a computer-readable storage medium, and a computer program product.

BACKGROUND OF THE INVENTION

An active matrix organic light emitting diode (AMOLED) display screen uses an organic material to manufacture a light emitting device, and uses a thin film transistor to construct a pixel circuit that drives the light emitting device to emit light. The pixel circuit includes a drive transistor.

However, a detection result obtained by detecting the drive transistor is inaccurate in the prior art.

SUMMARY OF THE INVENTION

In view of this, it is necessary to provide, for the above technical problem, a detection method and a debugging method for a display panel, a display panel, a detection apparatus, a computer device, a computer-readable storage medium, and a computer program product, which can improve accuracy of a display panel detection result.

A first aspect of embodiments of the present application provides a detection method for a display panel. The display panel includes a plurality of pixel columns, each pixel column including a plurality of pixel circuits, and a plurality of pixel circuits in a same column being connected to a detection module through a same detection signal line. The method includes: obtaining a first node voltage and a second node voltage in a target pixel column, where the first node voltage is a voltage at a connection node between a target color pixel circuit in the target pixel column that is farthest from the detection module and a detection signal line, and the second node voltage is a voltage at a connection node between a target color pixel circuit in the target pixel column that is closest to the detection module and the detection signal line; adjusting, based on the first node voltage and the second node voltage, a data voltage inputted to each target color pixel circuit in the target pixel column, so that preset voltages of a plurality of target color pixel circuits are the same, where the preset voltage is a difference between the data voltage inputted to the target color pixel circuit and a voltage at a connection node between the target color pixel circuit and the detection signal line; and detecting the plurality of target color pixel circuits in the target pixel column, to obtain detected data of each target color pixel circuit.

In some embodiments, the adjusting, based on the first node voltage and the second node voltage, a data voltage inputted to each target color pixel circuit in the target pixel column, so that preset voltages of a plurality of target color pixel circuits are the same includes:

- determining a voltage difference based on the first node voltage and the second node voltage;
- determining a voltage step based on the voltage difference and a number of the target color pixel circuits in the target pixel column;
- obtaining a reference data voltage corresponding to a reference pixel circuit of a target color in the target pixel column; and
- adjusting the reference data voltage by the voltage step at least one based on a position of a currently detected pixel circuit relative to the reference pixel circuit in the target pixel column, to obtain a data voltage for the currently detected pixel circuit.

In some embodiments, the adjusting the reference data voltage by the voltage step at least one times based on a position of a currently detected pixel circuit relative to the reference pixel circuit in the target pixel column, to obtain a data voltage for the currently detected pixel circuit includes:

- determining that the currently detected pixel circuit is an $i^{th}$ target color pixel circuit relative to the reference pixel circuit; and
- adjusting the voltage step i times on the basis of the reference data voltage for the currently detected pixel circuit, to determine the data voltage inputted to the currently detected pixel circuit, where $1 \leq i \leq n-1$, and n is the number of the target color pixel circuits in the target pixel column.

In some embodiments, when the currently detected pixel circuit is an $i^{th}$ target color pixel circuit on a side close to the detection module relative to the reference pixel circuit,

- the reference data voltage is decreased by i voltage steps, to obtain the data voltage for the currently detected pixel circuit; or
- when the currently detected pixel circuit is an $i^{th}$ target color pixel circuit arranged on a side away from the detection module relative to the reference pixel circuit,
- the reference data voltage is increased by i voltage steps, to obtain the data voltage for the currently detected pixel circuit.

In some embodiments, the detection method for a display panel further includes: obtaining detected data of each pixel circuit, and obtaining updated detected data of each pixel circuit based on the detected data of each pixel circuit, and a preset conversion coefficient.

In some embodiments, the detection method for a display panel further includes: obtaining the preset conversion coefficient through a plurality of test circuits.

The obtaining the preset conversion coefficient through a plurality of test circuits includes:

- separately detecting the plurality of test circuits under a first preset condition, to obtain a plurality of pieces of first test data, where the first preset condition includes controlling currents outputted by the plurality of test circuits to be greater than a preset value;
- separately detecting the plurality of test circuits under a second preset condition, to obtain a plurality of pieces of second test data, where the second preset condition includes controlling the currents outputted by the plurality of test circuits to be less than or equal to the preset value; and determining the preset conversion coefficient based on a functional relationship between the plurality of pieces of first test data and the plurality of pieces of second test data.

In some embodiments, the pixel circuit includes a drive transistor, a connection node between the pixel circuit and the detection signal line is a connection node between a target terminal of the drive transistor and the detection signal line, and a gate of the drive transistor is configured to receive the data voltage, where the target terminal is a source or a drain of the drive transistor.

In some embodiments, the detection method for a display panel further includes: resetting all the target color pixel circuits in the target pixel column before the plurality of target color pixel circuits in the target pixel column are detected; and resetting each target color pixel circuit in the target pixel column after the detected data of each target color pixel circuit in the target pixel column is obtained.

In some embodiments, the display panel includes at least one gating module, the gating module includes at least one gating switch, and each gating switch is arranged between a detection signal line connected to a column of pixel circuits and the detection module.

In some embodiments, the detecting the plurality of pixel circuits in the target pixel column, to obtain detected data of each pixel circuit includes:

turning on a gating switch corresponding to the target pixel column, and sequentially detecting the pixel circuits in the target pixel column, to obtain the detected data of each pixel circuit; and using a column where a column of pixel circuits that has not been detected is located on the display panel as a new target pixel column after all the pixel circuits in the target pixel column are detected, and returning to the step of turning on a gating switch corresponding to the target pixel column, and sequentially detecting the pixel circuits in the target pixel column, to obtain the detected data of each pixel circuit, until all columns of pixel circuits on the display panel have been detected.

In some embodiments, the detected data includes a detected voltage outputted by the detection module, and the detected voltage is related to a drive current of a currently detected pixel circuit at the preset voltage.

A second aspect of the embodiments of the present application provides a debugging method for a display panel. The method includes: obtaining a detection data voltage for a currently detected pixel circuit in a target pixel column by using the foregoing detection method;

determining whether detected data of the currently detected pixel circuit at the detection data voltage exceeds a standard detected data range; and adjusting, at least once if the detected data of the currently detected pixel circuit exceeds the standard detected data range, a data voltage inputted to the currently detected pixel circuit, until the detected data of the currently detected pixel circuit is within the standard detected data range, and recording a position of the currently detected pixel circuit, and a total adjustment amount for the currently detected pixel circuit; or recording, if the detected data of the currently detected pixel circuit does not exceed the standard detected data range, a position of the currently detected pixel circuit, and recording an adjustment amount for the currently detected pixel circuit as 0.

In some embodiments, the adjusting, at least once if the detected data of the currently detected pixel circuit exceeds the standard detected data range, a data voltage inputted to the currently detected pixel circuit includes:

if the detected data of the currently detected pixel circuit is greater than an upper limit value of the standard detected data range, determining a first adjustment amount based on a difference between the detected data of the currently detected pixel circuit and the upper limit value of the standard detected data range; and decreasing the data voltage for the currently detected pixel circuit by the first adjustment amount, to obtain an updated data voltage for the currently detected pixel circuit; or if the detected data of the currently detected pixel circuit is less than a lower limit value of the standard detected data range, determining a second adjustment amount based on a difference between the detected data of the currently detected pixel circuit and the lower limit value of the standard detected data range; and increasing the data voltage for the currently detected pixel circuit by the second adjustment amount, to obtain an updated data voltage for the currently detected pixel circuit.

In some embodiments, the debugging method for a display panel further includes:

determining a total adjustment amount for a corrected pixel circuit based on at least one first adjustment amount and/or at least one second adjustment amount for the corrected pixel circuit, where the corrected pixel circuit is a pixel circuit in which detected data of the currently detected pixel circuit obtained after adjustment of the data voltage is within the standard detected data range; and recording a position of each corrected pixel circuit, and a total adjustment amount corresponding to each corrected pixel circuit as a compensation voltage lookup table.

In some embodiments, the debugging method for a display panel further includes:

obtaining detected data of each pixel circuit of the display panel;

using a value with the highest probability of occurrence in the detected data of each pixel circuit of the display panel or an average value of detected data of each pixel circuit in a central preset region of the display panel as standard detected data; and obtaining the standard detected data range based on the standard detected data.

In some embodiments, the detected data includes a detected voltage outputted by the detection module, and the detected voltage is related to a drive current of the currently detected pixel circuit at the preset voltage.

A third aspect of the embodiments of the present application provides a display panel, including: a plurality of pixel columns, each pixel column including a plurality of pixel circuits; a detection module; and a processing module, where a plurality of pixel circuits in a same column are connected to the detection module through a same detection signal line, and the processing module is connected to the pixel circuits and the detection module.

The processing module is configured to:

obtain a first node voltage and a second node voltage in a target pixel column, where the first node voltage is a voltage at a connection node between a target color pixel circuit in the target pixel column that is farthest from the detection module and a detection signal line, and the second node voltage is a voltage at a connection node between a target color pixel circuit in the target pixel column that is closest to the detection module and the detection signal line;

adjust, based on the first node voltage and the second node voltage, a data voltage inputted to each target color pixel circuit in the target pixel column, so that preset voltages of a plurality of target color pixel circuits are the same, where the preset voltage is a difference between the data voltage inputted to the target color pixel circuit and a voltage at a connection node between the target color pixel circuit and the detection signal line; and detect the plurality of target color pixel circuits in the target pixel column, to obtain detected data of each target color pixel circuit.

A fourth aspect of the embodiments of the present application provides a detection apparatus for a display panel. The display panel includes a plurality of pixel columns, each pixel column including a plurality of pixel circuits, and a plurality of pixel circuits in a same column being connected to a detection module through a same detection signal line. The apparatus includes:

a data obtaining module configured to obtain a first node voltage and a second node voltage in a target pixel column, where the first node voltage is a voltage at a connection node between a target color pixel circuit in the target pixel column that is farthest from the detection module and a detection signal line, and the second node voltage is a voltage at a connection node between a target color pixel circuit in the target pixel column that is closest to the detection module and the detection signal line;

a voltage adjustment module configured to adjust, based on the first node voltage and the second node voltage, a data voltage inputted to each target color pixel circuit in the target pixel column, so that preset voltages of a plurality of target color pixel circuits are the same, where the preset voltage is a difference between the data voltage inputted to the target color pixel circuit and a voltage at a connection node between the target color pixel circuit and the detection signal line; and a data detection module configured to detect the plurality of target color pixel circuits in the target pixel column, to obtain detected data of each target color pixel circuit.

A fifth aspect of the embodiments of the present application provides a computer device, including a memory and a processor. The memory stores a computer program. When the processor executes the computer program, the foregoing detection method for a display panel and/or debugging method for a display panel are/is implemented.

A sixth aspect of the embodiments of the present application provides a computer-readable storage medium having stored thereon a computer program, where when the computer program is executed by a processor, the foregoing detection method for a display panel and/or debugging method for a display panel are/is implemented.

A seventh aspect of the embodiments of the present application provides a computer program product, including a computer program, where when the computer program is executed by a processor, the foregoing detection method for a display panel and/or debugging method for a display panel are/is implemented.

In the detection method and the debugging method for a display panel, the display panel, the detection apparatus, the computer device, the computer-readable storage medium, and the computer program product, the methods are applied to the display panel, where the display panel includes the plurality of pixel columns, each pixel column including the plurality of pixel circuits, and the plurality of pixel circuits in the same column being connected to the detection module through the same detection signal line. According to the method, the first node voltage and the second node voltage corresponding to the target color pixel circuits in the target pixel column are first obtained, where the first node voltage is the voltage at the connection node between the target color pixel circuit in the target pixel column that is farthest from the detection module and the detection signal line, and the second node voltage is the voltage at the connection node between the target color pixel circuit in the target pixel column that is closest to the detection module and the detection signal line. In this way, the first node voltage corresponding to the target color pixel circuit in the target pixel column to be detected that is farthest from the detection module and the second node voltage corresponding to the target color pixel circuit in the target pixel column to be detected that is closest to the detection module are obtained. Because the detection signal line has line impedance, there is a voltage drop, caused by the line impedance, between the first node voltage and the second node voltage, and the voltage drop may lead to an inaccurate detection result. In this case, the data voltage inputted to each target color pixel circuit in the target pixel column is adjusted based on the first node voltage and the second node voltage, so that the preset voltages of the plurality of target color pixel circuits are the same, where the preset voltage is the difference between the data voltage inputted to the target color pixel circuit and the voltage at the connection node between the target color pixel circuit and the detection signal line. The data voltage inputted to each target color pixel circuit in the target pixel column is adjusted, so that the preset voltages of the pixel circuits are the same, solving the original problem of different preset voltages of the target color pixel circuits due to the voltage drop caused by the impedance of the detection signal line, and ensuring that each target color pixel circuit is in the same driving state. Then, the plurality of target color pixel circuits in the target pixel column are detected to obtain the detected data of each target color pixel circuit related to a driving characteristic. In this case, because the detected data is obtained when each target color pixel circuit is in the same driving state, the obtained detected data of each target color pixel circuit is not affected by the voltage drop caused by the impedance of the detection signal line, and can accurately represent a difference between characteristics of the target color pixel circuits that affect drive currents. This difference is affected by only the characteristic of the target color pixel circuit that affects the drive current, and is not affected by the voltage drop caused by the line impedance of the detection signal line. Therefore, the detection result is more accurate.

BRIEF DESCRIPTION OF DRAWINGS

To describe the technical solutions in the implementations of the present application or in the prior art more clearly, the following briefly describes the accompanying drawings required for describing the implementations or the prior art.

Obviously, the accompanying drawings in the following description are only for some of the embodiments of the present application, and for those of ordinary skill in the art, other drawings can also be obtained from these drawings without any creative effort.

LIST OF REFERENCE NUMERALS

Figure 1:
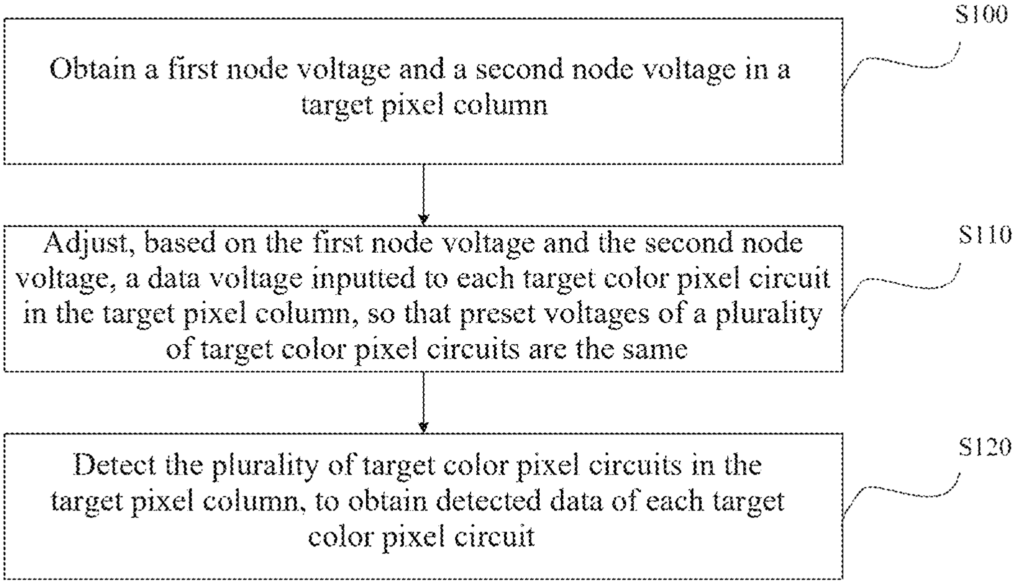
FIG. 1 is a schematic flowchart of a detection method for a display panel according to an embodiment.

10—Pixel column, 20—Pixel circuit, 30—Detection module, 100—Detection signal line, 40—Gating module, 200—Data signal line, 50—Processing module.

DETAILED DESCRIPTION OF THE INVENTION

For ease of understanding the present application, the present application will be described more comprehensively below with reference to relevant accompanying drawings. Embodiments of the present application are given in the accompanying drawings. However, the present application may be implemented in many different forms and is not limited to the embodiments described herein. Rather, these embodiments are provided so that the disclosure of the present application is more thorough and comprehensive.

Unless otherwise defined, all technical and scientific terms used herein shall have the same meanings as commonly understood by those skilled in the art to which the present application belongs. The terms used herein in the description of the present application are merely for the purpose of describing specific embodiments, and are not intended to limit the present application.

It can be understood that the terms "first", "second", etc. used in the present application may be used herein to describe various elements, but these elements are not limited by these terms. These terms are only used to distinguish a first element from another.

It should be noted that when an element is considered "connected" to another element, the element may be directly connected to the another element or connected to the another element via an intermediate element. In addition, a "connection" in the following embodiments should be understood as an "electrical connection", a "communication connection", etc., if an electrical signal or data is transmitted between connected objects.

As used herein, the singular forms "a/an", "one", and "the" may include plural forms as well, unless the context clearly indicates other manners. It should further be understood that the terms "include/comprise" or "have", etc. specify the presence of stated features, wholes, steps, operations, components, parts, or combinations thereof, but do not exclude the possibility of the presence or addition of one or combinations of other features, wholes, steps, operations, components, and parts. Furthermore, the term "and/or" used in this description includes any and all combinations of the relevant listed items.

A detection method for a display panel provided in the embodiments of the present application is applied to a display panel, and a method for adjusting a data voltage inputted to each target color pixel circuit in a target pixel column can be provided, to avoid impact of a voltage drop caused by impedance of a detection signal line on a detection result obtained by detecting a plurality of target color pixel circuits in the target pixel column, improving accuracy of the detection result.

In the related art, a detection result obtained by detecting a display panel may be inaccurate. Research of the inventor shows that the problem arises because when the display panel in the related art is detected, a plurality of pixel circuits in a same column are connected to a detection module through a same detection signal line. During detection, a potential of the detection line is locked by the detection module, the potential of the detection line is defaulted to a potential of a detected drive transistor, and then a same data voltage is inputted to the plurality of pixel circuits in the same column, so that all drive transistors have the same detection condition. However, the detection signal line has line impedance, and the potential locked by the detection module is a fixed value, so that actual potentials of drive transistors at different positions may be higher than the locked potential, and detection adjustments of the drive transistors at the different positions at the same data voltage are different. As a result, the detection result may be inaccurate due to the impact of the line impedance.

In view of the above technical problem, the inventors have found by research that adjusting the data voltage inputted to each target color pixel circuit in the target pixel column can avoid the impact of the voltage drop caused by the line impedance of the detection signal line on the detection result obtained by detecting the plurality of target color pixel circuits in the target pixel column, which can ensure that the plurality of target color pixel circuits have the same detection conditions and improve the accuracy of the detection results.

Figure 2:
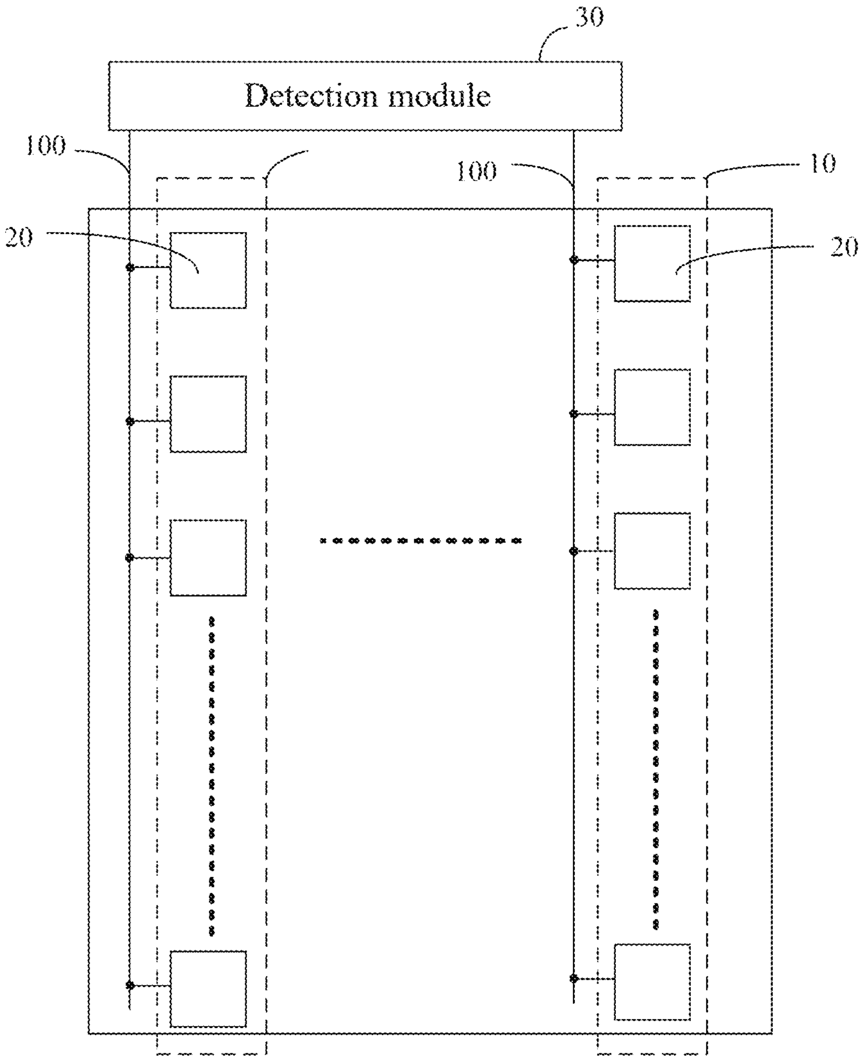
FIG. 2 is a schematic diagram of a display panel according to an embodiment.

In an embodiment, as shown in FIG. 1, there is provided a detection method for a display panel. FIG. 2 is a schematic diagram of the display panel. The display panel includes a plurality of pixel columns 10. The pixel column 10 includes a plurality of pixel circuits 20. A plurality of pixel circuits 20 in a same column are connected to a detection module 30 through a same detection signal line 100. The method includes step S100 to step S120.

Step S100: Obtain a first node voltage and a second node voltage in a target pixel column.

The first node voltage is a voltage at a connection node between a target color pixel circuit in the target pixel column that is farthest from the detection module and a detection signal line. The second node voltage is a voltage at a connection node between a target color pixel circuit in the target pixel column that is closest to the detection module and the detection signal line. Since the detection signal line has line impedance, there may be a voltage drop phenomenon (IR-Drop) between detection signal line connection nodes corresponding to different pixel circuits on a same detection signal line, resulting in a specific difference between voltages at the connection nodes corresponding to the different pixel circuits on the same detection signal line. Because the first node voltage is the voltage at the connection node between the target color pixel circuit in the target pixel column that is farthest from the detection module and the detection signal line, line impedance between a first node in the same pixel column and the detection module is the highest, and the first node voltage is the highest of all node voltages corresponding to the pixel circuits in the column. Because the second node voltage is the voltage at the connection node between the target color pixel circuit in the target pixel column that is closest to the detection module and the detection signal line, line impedance between a second node in the same pixel column and the detection module is the lowest, and the second node voltage is tested to be the lowest of all the node voltages corresponding to the pixel circuits in the column.

Step S110: Adjust, based on the first node voltage and the second node voltage, a data voltage inputted to each target color pixel circuit in the target pixel column, so that preset voltages of a plurality of target color pixel circuits are the same.

The preset voltage is a difference between the data voltage inputted to the target color pixel circuit and a voltage at a connection node between the target color pixel circuit and the detection signal line.

Because the impedance on the detection signal line is uniformly distributed, the impedance changes linearly. After the highest first node voltage and the lowest second node voltage in the same pixel column are determined, a node voltage corresponding to each pixel circuit between the first node and the second node changes linearly. Therefore, the node voltage corresponding to each pixel circuit between the first node and the second node may be determined based on the first node voltage and the second node voltage. After the node voltage corresponding to each target color pixel circuit in the target pixel column is determined, the data voltage inputted to each target color pixel circuit in the target pixel column may be adjusted, so that the preset voltages of the plurality of target color pixel circuits in the target pixel column are the same. Because the preset voltages of the plurality of target color pixel circuits in the target pixel column are the same, the plurality of target color pixel circuits in the target pixel column may be in the same driving state, eliminating impact of the impedance of the detection signal line on the driving states of the pixel circuits.

Step S120: Detect the plurality of target color pixel circuits in the target pixel column, to obtain detected data of each target color pixel circuit.

The data voltages may be sequentially provided to the plurality of target color pixel circuits in the target pixel column, to obtain drive currents outputted by the pixel circuits, and then calculation may be performed based on the drive currents, to obtain the detected data of the pixel circuits, thereby implementing detection of the pixel circuits.

Detected data of a currently detected pixel circuit is related to a drive current of the currently detected pixel circuit. The detected data may be understood as comprehensive data representing all factors, that may affect the drive current, in the pixel circuit, for example, representing a threshold voltage, mobility, impedance, and other factors of a drive transistor in the pixel circuit.

A target color pixel of a target color pixel circuit in a pixel column may be at least one of a red pixel, a green pixel, and a blue pixel. If pixels in a pixel column are of the same color, the target color pixel circuits are all pixel circuits in the pixel column. If there are pixels of different colors in a pixel column, for example, the pixel column includes red pixels, green pixels, and blue pixels, the target color pixel circuits may be all the red pixel circuits in the column, all the green pixel circuits in the column, or all the blue pixel circuits in the column. That is, the plurality of target color pixel circuits are a plurality of pixel circuits of the same color.

In this embodiment, according to the method, the data voltage inputted to each target color pixel circuit in the target pixel column is adjusted based on the first node voltage and the second node voltage, so that the preset voltages of the plurality of target color pixel circuits in the target pixel column are the same, solving the original problem of different preset voltages of the target color pixel circuits due to a voltage drop caused by the line impedance. Further, the preset voltages corresponding to the target color pixel circuits being the same ensures that each target color pixel circuit is in the same driving state. Then, the plurality of target color pixel circuits in the target pixel column are detected to obtain the detected data of each target color pixel circuit. In this case, because the detected data is obtained when each target color pixel circuit is in the same driving state, the obtained detected data of each target color pixel circuit is not affected by the voltage drop caused by the line impedance of the detection signal line, and can accurately represent a difference between characteristics of the target color pixel circuits that affect drive currents. This difference is affected by only the characteristic of the target color pixel circuit that affects the drive current, and is not affected by the voltage drop caused by the line impedance of the detection signal line. Therefore, a detection result is more accurate.

Figure 3:
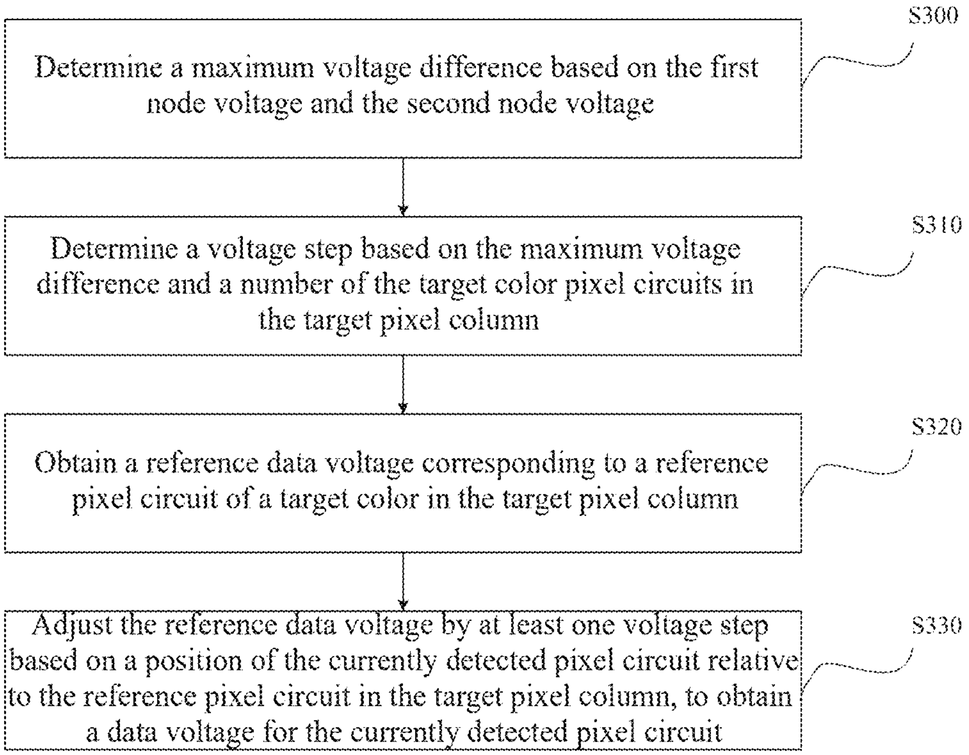
FIG. 3 is a schematic flowchart of a method for adjusting a data voltage according to an embodiment.

In an embodiment, as shown in FIG. 3, in step S110, the adjusting, based on the first node voltage and the second node voltage, a data voltage inputted to each target color pixel circuit in the target pixel column, so that preset voltages of a plurality of target color pixel circuits are the same includes step S300 to step S330.

Step S300: Determine a voltage difference based on the first node voltage and the second node voltage.

A maximum preset voltage in nodes corresponding to the pixel circuits between the first node and the second node may be determined based on the first node voltage and the second node voltage. A difference between the first voltage and the second node voltage is the voltage difference between nodes corresponding to the target color pixel circuits on the same detection signal line.

For example, the voltage difference is calculated according to the following formula:

$$\Delta V = V1 - V2$$

where ΔV is the maximum voltage difference, V1 is the first node voltage, and V2 is the second node voltage.

Step S310: Determine a voltage step based on the voltage difference and a number of the target color pixel circuits in the target pixel column.

Because the impedance on the detection signal line is uniformly distributed, the impedance changes linearly. After the highest first node voltage and the lowest second node voltage in the same pixel column are determined, the node voltage corresponding to each pixel circuit between the first node and the second node changes linearly. Therefore, the voltage step may be determined based on the voltage difference and the number of the target color pixel circuits in the target pixel column.

For example, the voltage step is calculated according to the following formula:

$$\Delta V0 = \Delta V/(N - 1)$$

where ΔV0 is the voltage step, ΔV is the maximum voltage difference, and N is the number of the target color pixel circuits in the target pixel column.

Step S320: Obtain a reference data voltage corresponding to a reference pixel circuit of a target color in the target pixel column.

Any target color pixel circuit in the target pixel column may be selected as the reference pixel circuit. Then, the reference data voltage corresponding to the reference pixel circuit is set, and a data voltage for a remaining target color pixel circuit in the target pixel column is adjusted based on a position relative to the reference pixel circuit and the reference data voltage.

Step S330: Adjust the reference data voltage by at least one voltage step based on a position of the currently detected pixel circuit relative to the reference pixel circuit in the target pixel column, to obtain a data voltage for the currently detected pixel circuit.

The position of the currently detected pixel circuit relative to the reference pixel circuit in the target pixel column is a pixel circuit number of the currently detected pixel circuit relative to the reference pixel circuit. Then, the reference data voltage may be adjusted by several voltage steps based on the pixel circuit number of the currently detected pixel circuit relative to the reference pixel circuit, to obtain the data voltage for the currently detected pixel circuit. Certainly, it is also necessary to determine, during adjustment based on whether the currently detected pixel circuit is at a position on a side close to the detection module relative to the reference pixel circuit or the currently detected pixel circuit is at a position on a side away from the detection module relative to the reference pixel circuit, whether to perform adjustment by more or fewer voltage steps.

For example, the data voltage for the currently detected pixel circuit is determined according to the following formula:

$$Vdata(n) = Vdata(k) + (n - k) \cdot \Delta V/(N - 1)$$

Vdata(n) is the data voltage for the currently detected pixel circuit, Vdata(k) is the reference data voltage, n is a position number of the currently detected pixel circuit, and k is a position number of the reference pixel circuit, where position numbers of pixel circuits in the same column sequentially increase in a direction of getting away from the detection module. ΔV is the maximum voltage difference, and N is the number of the target color pixel circuits in the target pixel column.

For example, an example is given for description. In the manner in this embodiment, for example, if the first node voltage is 0.89 V, and the second node voltage is 0.91 V, the voltage difference is 0.91−0.89=0.02 V. If there are 11 pixel circuits of the same color in the pixel column, the voltage step is 0.02/10=0.002 V. Assuming that a data voltage corresponding to a pixel circuit numbered 1 is set to 1.49 V, a data voltage corresponding to a pixel circuit numbered 2 is 1.492 V, a data voltage corresponding to a pixel circuit numbered 3 is 1.494 V, . . . , and by analogy, a data voltage corresponding to a pixel circuit numbered 11 is 1.51 V.

In this embodiment, the reference data voltage is adjusted by at least one voltage step based on the position of the currently detected pixel circuit relative to the reference pixel circuit in the target pixel column, to obtain the data voltage corresponding to the currently detected pixel circuit, thereby implementing adjustment of the data voltage.

Figure 4:
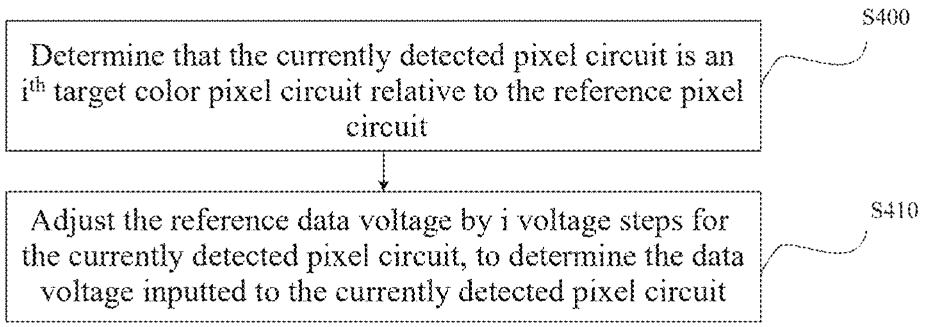
FIG. 4 is a schematic flowchart of a method for adjusting a data voltage according to another embodiment.

In an embodiment, as shown in FIG. 4, in step S330, the adjusting the reference data voltage by voltage step at least one times based on a position of the currently detected pixel circuit relative to the reference pixel circuit in the target pixel column, to obtain a data voltage for the currently detected pixel circuit includes step S400 and step S410.

Step S400: Determine that the currently detected pixel circuit is an $i^{th}$ target color pixel circuit relative to the reference pixel circuit.

The pixel circuits in the same column are sequentially numbered in the direction of getting away from the detection module, and numbers increase by 1 sequentially. For example, if the reference pixel circuit is the first target color pixel circuit close to the detection module, the reference pixel circuit is numbered 1; or if the currently detected pixel circuit is the fifth target color pixel circuit close to the detection module, the reference pixel circuit is numbered 5, and the currently detected pixel circuit is the fourth target color pixel circuit relative to the reference pixel circuit.

Step S410: Adjust the reference data voltage by i voltage steps for the currently detected pixel circuit, to determine the data voltage inputted to the currently detected pixel circuit.

$1 \le i \le n-1$, where n is the number of the target color pixel circuits in the target pixel column.

Optionally, when the currently detected pixel circuit is an $i^{th}$ target color pixel circuit on a side close to the detection module relative to the reference pixel circuit, the reference data voltage is decreased by i voltage steps, to obtain the data voltage for the currently detected pixel circuit.

For example, if the currently detected pixel circuit is numbered 2, and the reference pixel circuit is numbered 5, i=3. The data voltage for the currently detected pixel circuit is determined according to the following formula:

$$Vdata(2)=Vdata(5)+(2-5)\cdot\Delta V/(N-1)$$

where Vdata(2) is the data voltage for the currently detected pixel circuit, Vdata(5) is the reference data voltage, 2 is the position number of the currently detected pixel circuit, 5 is the position number of the reference pixel circuit, ΔV is the maximum voltage difference, and N is the number of the target color pixel circuits in the target pixel column.

When the currently detected pixel circuit is an $i^{th}$ target color pixel circuit arranged on a side away from the detection module relative to the reference pixel circuit, the reference data voltage is increased by i voltage steps, to obtain the data voltage for the currently detected pixel circuit.

For example, if the currently detected pixel circuit is numbered 5, and the reference pixel circuit is numbered 2, i=3. The data voltage for the currently detected pixel circuit is determined according to the following formula:

$$Vdata(5)=Vdata(2)+(5-2)\cdot\Delta V/(N-1)$$

where Vdata(5) is the data voltage for the currently detected pixel circuit, Vdata(2) is the reference data voltage, 5 is the position number of the currently detected pixel circuit, 2 is the position number of the reference pixel circuit, ΔV is the maximum voltage difference, and Nis the number of the target color pixel circuits in the target pixel column.

In this embodiment, because the impedance on the detection signal line is uniformly distributed, the impedance changes linearly. Therefore, the reference data voltage is adjusted by at least one voltage step based on the position of the currently detected pixel circuit relative to the reference pixel circuit in the target pixel column, to obtain the data voltage corresponding to the currently detected pixel circuit, implementing adjustment of the data voltage.

In an embodiment, the detection method for a display panel further includes: obtaining detected data of each pixel circuit, and obtaining updated detected data of each pixel circuit based on the detected data of each pixel circuit, and a preset conversion coefficient.

Because the detection module is insensitive to an extremely low current and there is obvious noise, it is necessary to increase a detection current to the greatest extent, to improve a signal-to-noise ratio. For example, a high detection current is at a μA level. Using the high detection current to detect the pixel circuit can improve the signal-to-noise ratio of the detected circuit and obtain more accurate detected data. However, for the pixel circuit, a light emitting current of the pixel circuit in a display mode is at an nA level, that is, at a low current level, so that detected data at the low current level is closer to an actual condition of the pixel circuit. Therefore, the pixel is detected by using a high current, to obtain more accurate detected data, and then the detected data is converted into detected data at the low current level by using the preset conversion coefficient, to obtain converted detected data of the pixel circuit, where the converted detected data is used to compensate for a driving characteristic difference of the drive transistor.

In this embodiment, the pixel is detected by using the high current, to obtain the more accurate detected data, and then the detected data is converted into the detected data at the low current level by using the preset conversion coefficient. This considers both accuracy of the detected data obtained through detection and practicality of the detected data.

Figure 5:
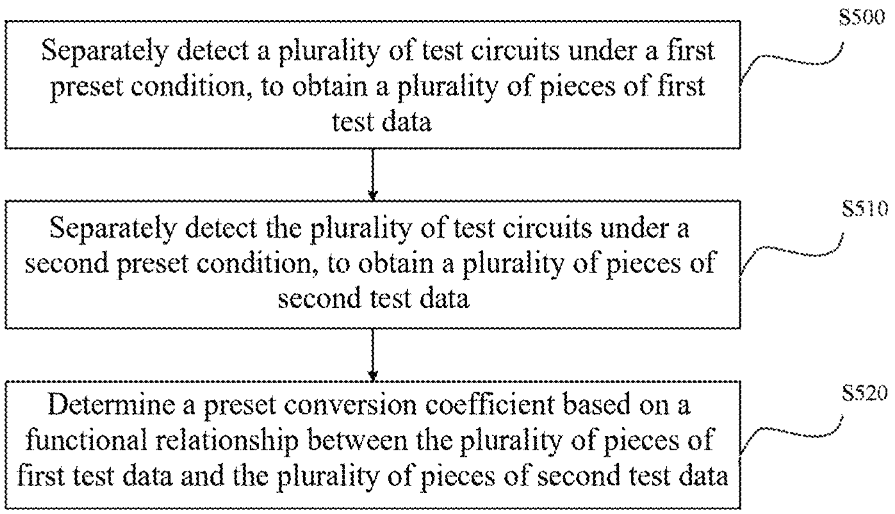
FIG. 5 is a schematic flowchart of a method for calculating a conversion coefficient according to an embodiment.

In an embodiment, as shown in FIG. 5, the detection method for a display panel further includes: obtaining the preset conversion coefficient through a plurality of test circuits.

The obtaining the preset conversion coefficient through a plurality of test circuits includes step S500 to step S520.

Step S500: Separately detect the plurality of test circuits under a first preset condition, to obtain a plurality of pieces of first test data, where the first preset condition includes controlling currents outputted by the plurality of test circuits to be greater than or equal to a first preset current value. The test circuits are pixel circuits of the same batch as the pixel circuits of the display panel to be detected. A plurality of drive transistors in the test circuit may be set to have a same gate voltage, so that the current outputted by the test circuit is greater than a preset value. The first preset current value may be 1 μA.

Step S510: Separately detect the plurality of test circuits under a second preset condition, to obtain a plurality of pieces of second test data.

The second preset condition includes controlling the currents outputted by the plurality of test circuits to be less than or equal to a second preset current value. Gate voltages of the drive transistors in the test circuit may be set, so that the current outputted by the test circuit is less than or equal to the second preset current value. The second preset current value may be 1 nA.

Step S520: Determine the preset conversion coefficient based on a functional relationship between the plurality of pieces of first test data and the plurality of pieces of second test data.

After a large amount of first test data and a large amount of second test data are obtained for a same test circuit, a functional relationship between first test data and second test data for each test circuit may be determined. In the present application, the functional relationship between the first test data and the second test data of the test circuit is a directly proportional relationship. Then, a conversion coefficient that can best represent a conversion relationship between the first test data and the second test data may be obtained as the preset conversion coefficient based on conversion coefficients corresponding to a large number of test circuits, for example, an average value of the conversion coefficients corresponding to the large number of test circuits, a value with the highest probability of occurrence, or a median.

Optionally, after a large amount of first test data and a large amount of second test data are obtained for the same test circuit, a first threshold voltage may be calculated based on each piece of first test data, a second threshold voltage may be calculated based on each piece of second test data, and a conversion coefficient between a first threshold voltage and a second threshold voltage of each test circuit may be determined. Then, a conversion coefficient that can best represent a conversion relationship between the first threshold voltage and the second threshold voltage may be obtained as the preset conversion coefficient based on conversion coefficients corresponding to a large number of test circuits, for example, an average value of the conversion coefficients corresponding to the large number of test circuits, a value with the highest probability of occurrence, or a median.

If the conversion coefficient is calculated by using threshold voltages, the debugging method of the present application further includes: after the detected data is obtained, calculating a threshold voltage at a high detection current by using a relationship between detected data and a threshold voltage, then calculating a threshold voltage at a low display current by using the conversion coefficient, and calculating detected data at the low display current by using the threshold voltage at the low display current.

Figure 6:
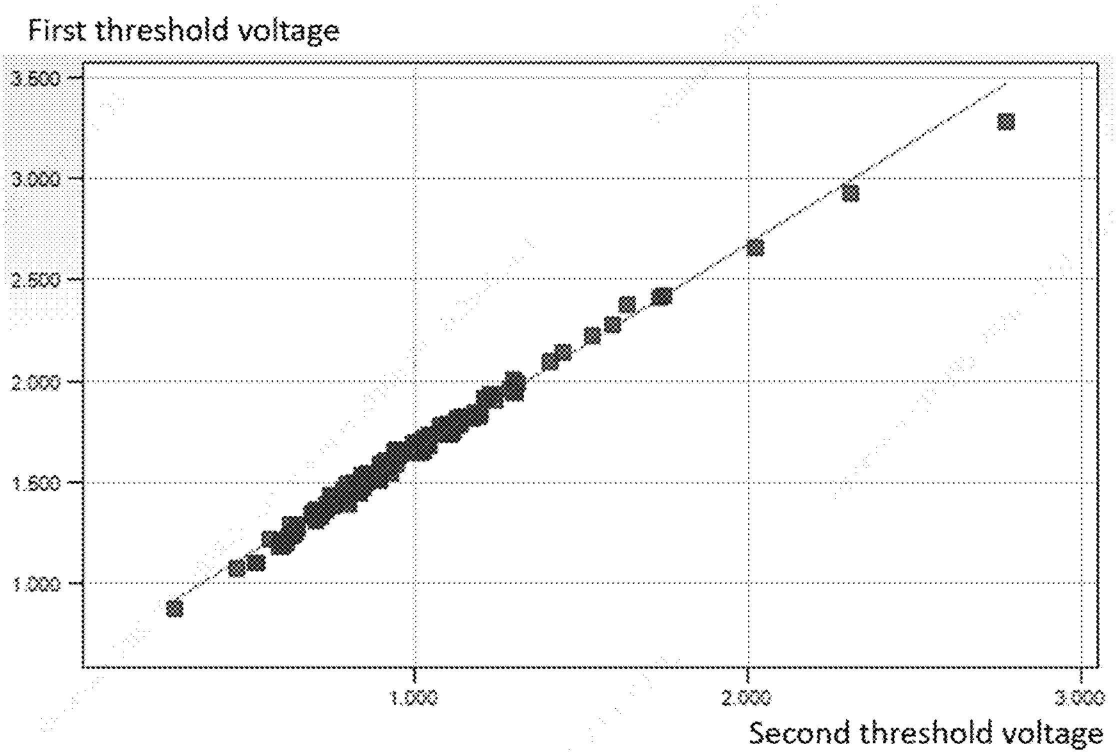
FIG. 6 is a schematic dotted diagram of test circuits according to an embodiment.

For example, reference may be made to FIG. 6. In FIG. 6, each dot represents a test circuit, a horizontal coordinate is a second threshold voltage of the test circuit, and a vertical coordinate is a first threshold voltage of the test circuit. A conversion coefficient corresponding to dots representing test circuits in most concentrated distribution in FIG. 6 may be used as the preset conversion coefficient.

The conversion coefficient is calculated according to the following formula:

$$K = Vth2/Vth1$$

Vth1 is the first threshold voltage of the test circuit under the first preset condition, Vth2 is the second threshold voltage of the test circuit under the second preset condition, and K is the conversion coefficient. In this embodiment, the preset conversion coefficient is calculated through pre-calibration, so that the pixel can be detected by using the high current, to obtain more accurate detected data, and then the detected data is converted into the detected data at the low current level by using the preset conversion coefficient. This considers both the accuracy of the detected data obtained through detection and the practicality of the detected data.

Figure 7:
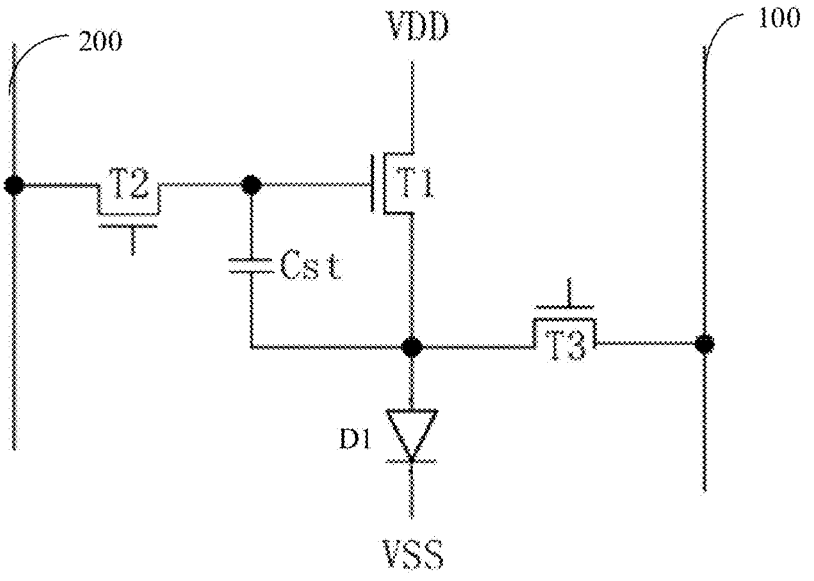
FIG. 7 is a schematic diagram of a display panel according to another embodiment.

In an embodiment, as shown in FIG. 7, the pixel circuit includes a drive transistor T1, a connection node between the pixel circuit and the detection signal line 100 is a connection node between a target terminal of the drive transistor T1 and the detection signal line 100, and a gate of the drive transistor T1 is configured to receive the data voltage.

The target terminal is a source or a drain of the drive transistor.

For example, the pixel circuit includes the drive transistor T1, a second transistor T2, a third transistor T3, a light emitting element D1, and a storage capacitor Cst. A first terminal of the drive transistor T1 is electrically connected to a first power line VDD. A second terminal of the drive transistor T1 is separately electrically connected to a first terminal of the light emitting element D1 and a first terminal of the third transistor T3. A second terminal of the light emitting element D1 is electrically connected to a second power line VSS. A second terminal of the third transistor T3 is connected to the detection signal line 100. The second transistor T2 is configured to transmit a data voltage on a data signal line 200 to the gate of the drive transistor T1. During detection, the data voltage at the gate of the drive transistor T1 remains unchanged, a voltage at the second terminal is gradually increased, and when a current flowing through the drive transistor T1 approaches zero, the voltage at the second terminal of the drive transistor T1 no longer changes. After the third transistor T3 is turned on, the voltage at the second terminal of the drive transistor T1 is transmitted to the detection module outside the pixel circuit through the detection signal line 100, so that the detection module calculates detected data of the drive transistor T1 based on the voltage at the second terminal of the drive transistor T1 and the data voltage.

In this embodiment, the pixel circuit includes the drive transistor T1, and the connection node between the pixel circuit and the detection signal line 100 is the connection node between the target terminal of the drive transistor T1 and the detection signal line 100. Therefore, a specific pixel circuit is provided.

Figure 8:
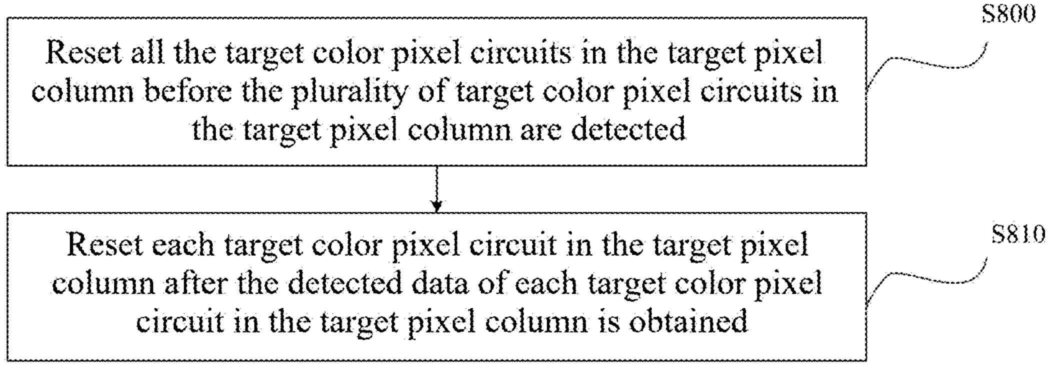
FIG. 8 is a schematic flowchart of a method for detection resetting according to an embodiment.

In an embodiment, as shown in FIG. 8, the detection method for a display panel further includes step S800 and step S810.

Step S800: Reset all the target color pixel circuits in the target pixel column before the plurality of target color pixel circuits in the target pixel column are detected.

Step S810: Reset each target color pixel circuit in the target pixel column after the detected data of each target color pixel circuit in the target pixel column is obtained.

Before the plurality of target color pixel circuits in the target pixel column are detected, a black image may be written into a plurality of target color pixels in the target pixel column, a reset power supply is electrically connected to the second terminal of the third transistor T3, and after the detection is completed, a reset voltage is transmitted to an anode of the light emitting element D1 via the third transistor T3, to ensure that drive transistors of all the pixel circuits are turned off; and after the detection of each target color pixel circuit in the target pixel column is completed, a black image is written into each target color pixel circuit in the target pixel column again, to avoid generation of interference that affects display of the pixel circuits. Alternatively, after detection of target pixels in the upper row of two adjacent rows of target pixels and before detection of target pixels in the lower row, third transistors T3 of pixel circuits in the two rows may be turned on, and a black image may be written into all the pixel circuits in the upper row and the lower row.

In this embodiment, the target color pixel circuits are reset before and after the target color pixel circuits are detected, so that it is ensured that a detection result obtained each time is not affected by interference of previous detection, nor affects display of the pixel circuits, improving the accuracy of the detection result.

Figure 9:
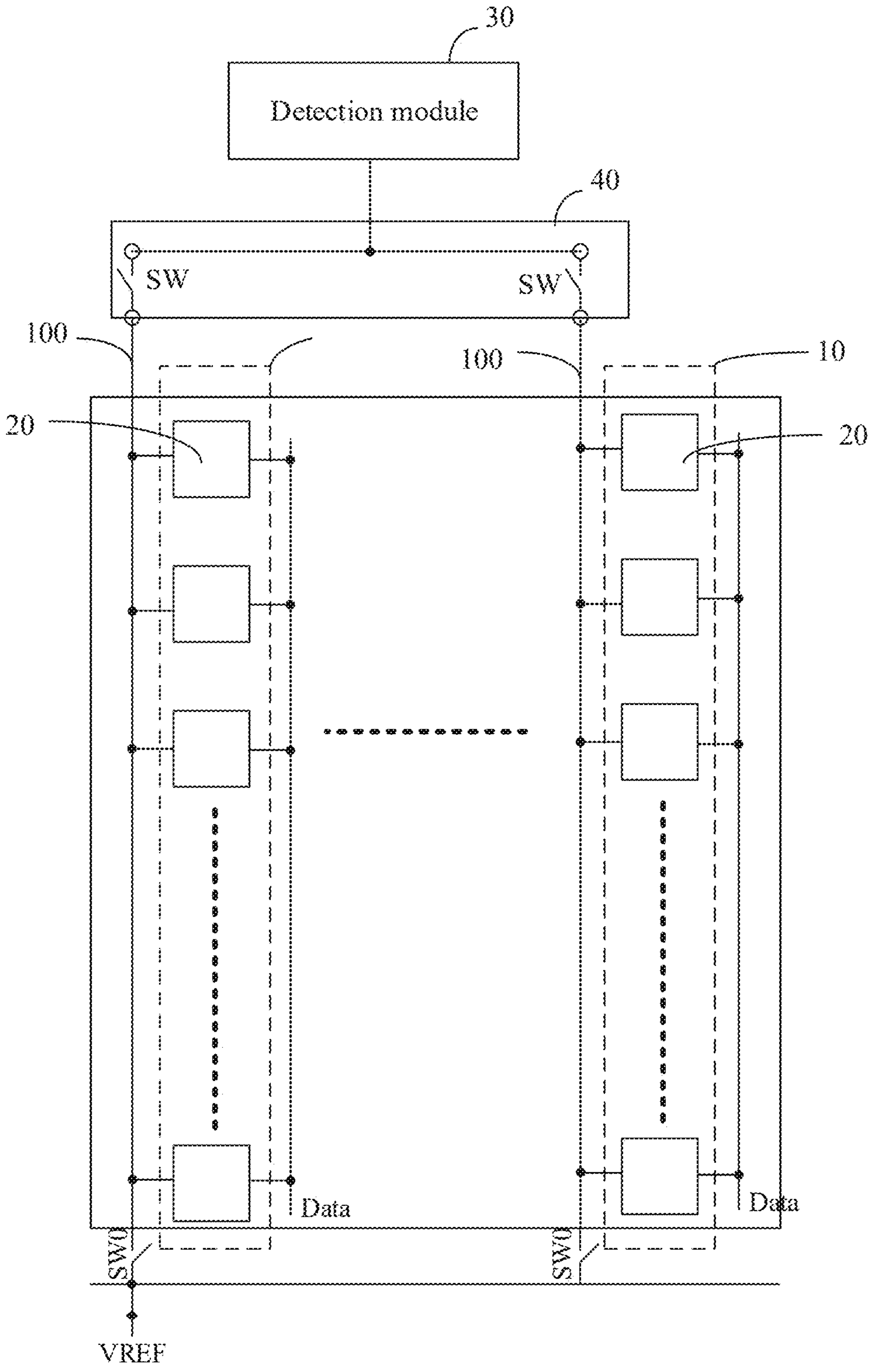
FIG. 9 is a second schematic diagram of a display panel according to another embodiment.

In an embodiment, as shown in FIG. 9, the display panel includes at least one gating module 40, the gating module 40 includes at least one gating switch SW, and each gating switch SW is arranged between a detection signal line 100 connected to a column of pixel circuits 20 and the detection module 30.

Figure 10:
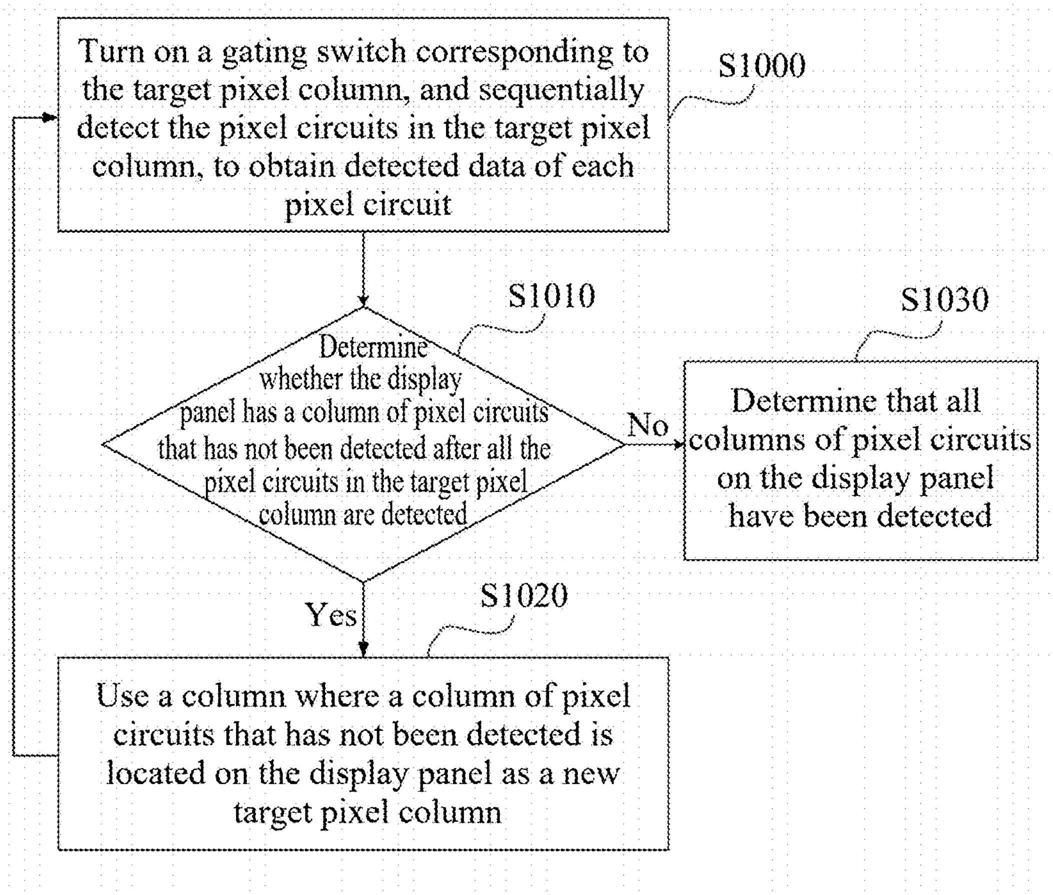
FIG. 10 is a schematic flowchart of a detection method according to an embodiment.

As shown in FIG. 10, in step S120, the detecting the plurality of target color pixel circuits in the target pixel column, to obtain detected data of each target color pixel circuit includes step S1000 to step S1030.

Step S1000: Turn on a gating switch corresponding to the target pixel column, and sequentially detect the pixel circuits in the target pixel column, to obtain detected data of each pixel circuit.

One gating module may include a plurality of gating switches, and each gating switch is connected to one detection signal line. That is, one gating switch corresponds to one pixel column. The gating switch corresponding to the target pixel column is turned on, that is, the detection signal line corresponding to the target pixel column is connected to the detection module. Then, pixels in the target pixel column are turned on row by row, so that the pixel circuits in the target pixel column are sequentially detected, to obtain the detected data of each pixel circuit in the target pixel column.

Step S1010: After all the pixel circuits in the target pixel column are detected, determine whether the display panel has a column of pixel circuits that has not been detected. If the display panel has a column of pixel circuits that has not been detected, step S1020 is performed; or if the display panel does not have a column of pixel circuits that has not been detected, step S1030 is performed.

Step S1020: Use a column where a column of pixel circuits that has not been detected is located on the display panel as a new target pixel column, and perform step S1000 again.

Step S1030: Determine that all columns of pixel circuits on the display panel have been detected.

After a column of pixel circuits is detected, a next column of pixel circuits is detected, until a plurality of columns of pixel circuits connected to one gating module are all detected.

The detected data includes a detected voltage outputted by the detection module, and the detected voltage is related to a drive current of the currently detected pixel circuit at the preset voltage.

Figure 11:
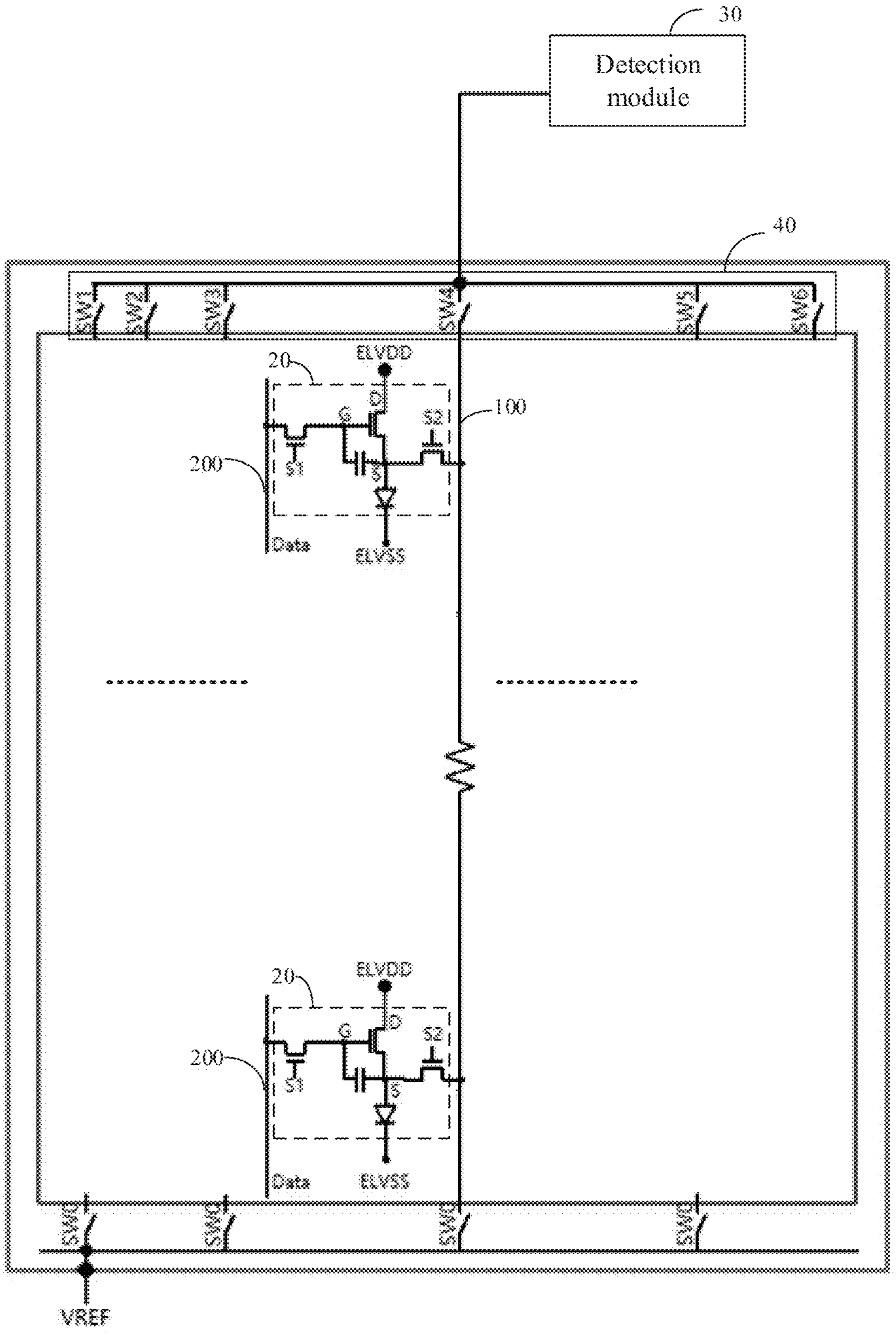
FIG. 11 is a third schematic diagram of a display panel according to another embodiment.
Figure 12:
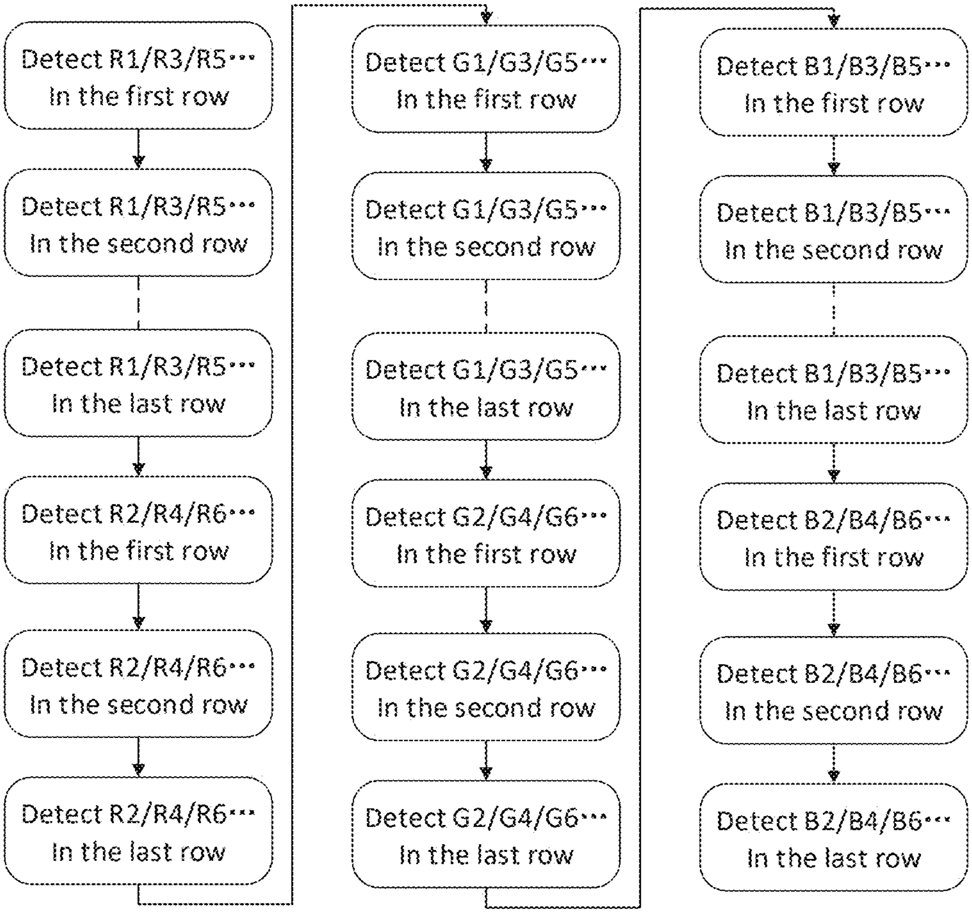
FIG. 12 is a schematic diagram of a detection process according to an embodiment.

For example, description is given by using an example in which real pixel arrangement is used for the display panel, that is, a same column has a plurality of self-pixels of the same color, and one gating module 40 includes six gating switches (SW1 to SW6). FIG. 11 is a schematic diagram of the display panel. It may be understood that pixel circuits 20 in a same column are connected to a same data signal line 200, pixel circuits 20 in a same row are connected to different data signal lines 200, and different data signals are inputted to the pixel circuits 20 in the same row. The figure illustrates a case where there is only one gating module 40. It may be understood that the display panel may include a plurality of gating modules, and each gating module is connected in the manner as shown in FIG. 11. For the display panel shown in FIG. 11, it is assumed that colors of pixels in six columns corresponding to the six gate switches are as follows: the first and second columns are all red pixels (R1 and R2), the third and fourth columns are all green pixels (G1 and G2), and the fifth and sixth columns are all blue pixels (B1 and B2); for a next gating module, the seventh and eighth columns are all red pixels (R3 and R4), the ninth and tenth columns are all green pixels (G3 and G4), the eleventh and twelfth columns are all blue pixels (B3 and B4); and so on. FIG. 12 is a schematic flowchart of detecting the display panel. Pixel circuits corresponding to all the pixels of the entire display panel are detected at a detection phase through the following process: in a first frame: detecting the red pixels in the odd columns, that is, detecting the pixel circuits (R1) in the first column, the pixel circuits (R3) in the seventh column, the pixel circuits (R5) in the thirteenth column, etc., specifically detecting the red pixels R1, R3, R5, . . . , etc. in the first row, then detecting the red pixels R1, R3, R5, . . . , etc. in the second row, and so on, until the red pixels R1, R3, R5, . . . , etc. in the last row are detected; in a second frame: detecting the red pixels in the even columns, that is, detecting the pixel circuits (R2) in the second column, the pixel circuits (R4) in the eighth column, the pixel circuits (R6) in the fourteenth column, etc., specifically detecting the red pixels R2, R4, R6, . . . , etc. in the first row, then detecting the red pixels R2, R4, R6, . . . , etc. in the second row, and so on, until the red pixels R2, R4, R6, . . . , etc. in the last row are detected; and detecting the green pixels in the odd columns in a third frame, detecting the green pixels in the even columns in a fourth frame, detecting the blue pixels in the odd columns in a fifth frame, and detecting the blue pixels in the even columns in a sixth frame. Detection processes of the green pixels and the blue pixels are exactly the same as that of the red pixels, and details are not described again. All the pixel circuits of the display panel shown in FIG. 11 are detected within time of the six frames.

Optionally, if there are pixels of different colors in a pixel column, for example, a pixel column includes red pixels, green pixels, and blue pixels: the first row is red pixels, the second row is green pixels, and the third row is blue pixels, within time of one frame, the red pixels in the first row are detected first, then the green pixels in the second row are detected, then the blue pixels in the third row are detected, and so on, until the last row is detected. Even if there are pixels of different colors in a pixel column, the pixel column is still detected row by row. A detection process of the pixel column is the same as described above, and details are not described again.

In this embodiment, a specific detection process is provided, to complete detection of each pixel circuit of the display panel.

Figure 13:
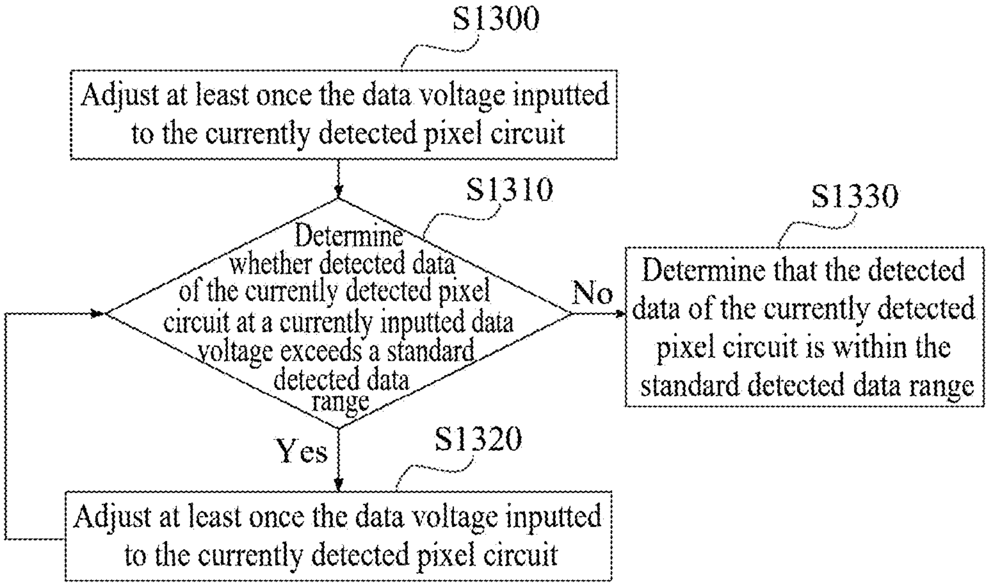
FIG. 13 is a schematic flowchart of a debugging method for a display panel according to an embodiment.

In an embodiment, as shown in FIG. 13, there is provided a debugging method for a display panel. The method includes the following steps.

Step S1300: Obtain a detection data voltage for each currently detected pixel circuit in a target pixel column according to the detection method in the above embodiments.

Step S1310: Determine whether detected data of the currently detected pixel circuit at a currently inputted data voltage exceeds a standard detected data range. If the detected data of the currently detected pixel circuit exceeds the standard detected data range, step S1320 is performed; or if the detected data of the currently detected pixel circuit does not exceed the standard detected data range, step S1330 is performed.

The standard detected data range is a preset range. If the detected data of the currently detected pixel circuit at the currently inputted data voltage is within the standard detected data range, it indicates that the data voltage for the currently detected pixel circuit meets a standard and the data voltage does not need to be adjusted. If the detected data of the currently detected pixel circuit at the currently inputted data voltage is beyond the standard detected data range, it indicates that the data voltage for the currently detected pixel circuit needs to be further adjusted until the detected data of the currently detected pixel circuit meets the standard detected data range.

Step S1320: Adjust at least once the data voltage inputted to the currently detected pixel circuit, and determine whether detected data of the currently detected pixel circuit obtained after input of an adjusted data voltage exceeds the standard detected data range. That is, step S1310 is performed again after step S1320 is performed.

Adjusting the data voltage inputted to the currently detected pixel circuit may be increasing the data voltage or decreasing the data voltage. Whether to increase or decrease the data voltage specifically depends on whether the detected data of the currently detected pixel circuit is greater than an upper limit value of the standard detected data range or less than a lower limit value of the standard detected data range. Then, whether the detected data of the currently detected pixel circuit at the currently inputted data voltage exceeds the standard detected data range is determined again after the data voltage is adjusted. When the detected data of the currently detected pixel circuit is within the standard detected data range, a position of the currently detected circuit and a total adjustment amount for the currently detected pixel circuit are recorded.

Step S1330: Determine that the detected data of the currently detected pixel circuit is within the standard detected data range.

When it is determined that the detected data of the currently detected pixel circuit at the currently inputted data voltage does not exceed the standard detected data range, it is determined that the detected data of the currently detected pixel circuit is within the standard detected data range, and the data voltage for the currently detected pixel circuit does not need to be further adjusted. If it is determined, when step S1310 is performed for the first time, that the detected data of the currently detected pixel circuit at the detection data voltage does not exceed the standard detected data range, the position of the currently detected pixel circuit is recorded, and an adjustment amount for the currently detected pixel circuit is recorded as 0.

In this embodiment, it is determined whether the detected data of the currently detected pixel circuit at the currently inputted data voltage exceeds the standard detected data range, and when the detected data of the currently detected pixel circuit at the currently inputted data voltage exceeds the standard detected data range, the data voltage inputted to the currently detected pixel circuit is adjusted for one or more times until the detected data of the currently detected pixel circuit at the currently inputted data voltage is within the standard detected data range, to implement adjustment of the data voltage for the pixel circuit. After the adjustment in this embodiment is completed for all pixel circuits of the display panel, detected data of all the pixel circuits is within the standard detected data range. Therefore, uniformity of the display panel is improved.

Figure 14:
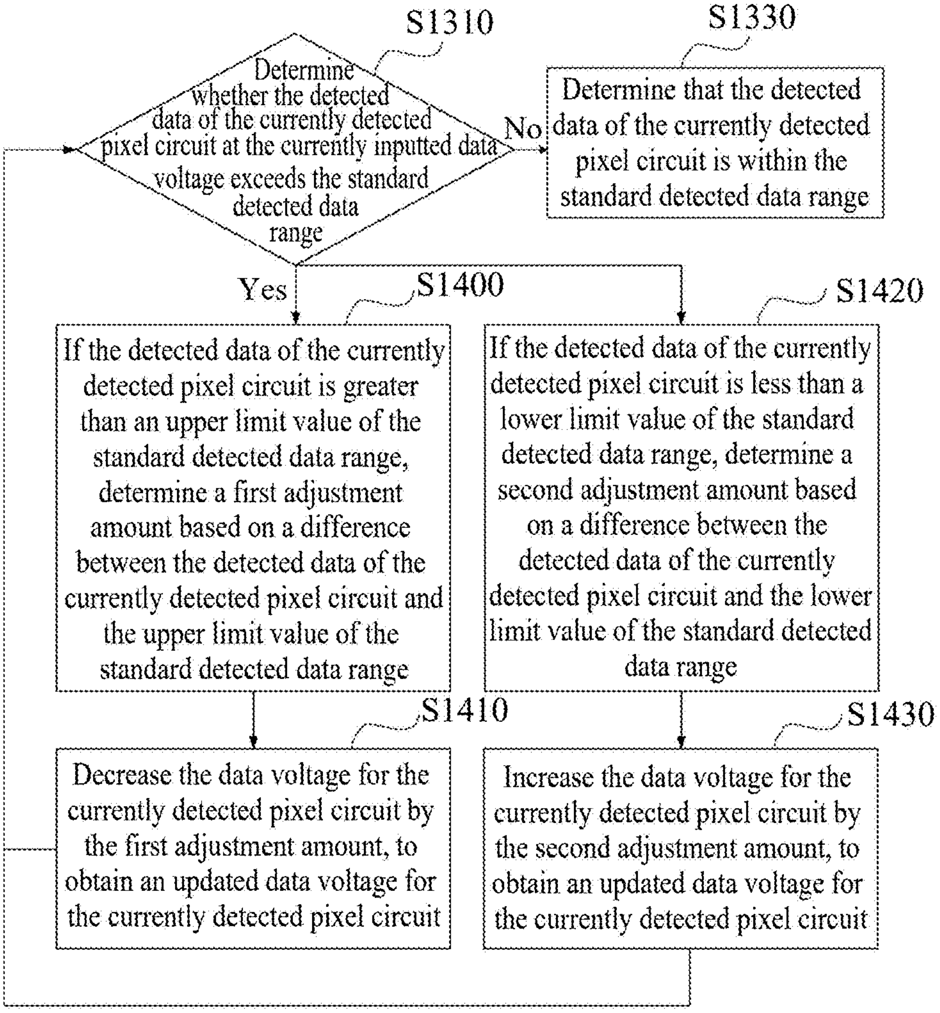
FIG. 14 is a schematic flowchart of a method for adjusting a data voltage according to another embodiment.

In an embodiment, as shown in FIG. 14, in S1320, the adjusting, at least once if the detected data of the currently detected pixel circuit exceeds the standard detected data range, a data voltage inputted to the currently detected pixel circuit includes step S1400 to step S1430.

Step S1400: If the detected data of the currently detected pixel circuit is greater than the upper limit value of the standard detected data range, determine a first adjustment amount based on a difference between the detected data of the currently detected pixel circuit and the upper limit value of the standard detected data range.

If the detected data of the currently detected pixel circuit is greater than the upper limit value of the standard detected data range, it indicates that the detected data is not within the standard detected data range and the detected data is overly large, and therefore the first adjustment amount is determined. For example, the detected data of the currently detected pixel circuit is 5 V, and the standard detected data range is 2 V to 4 V. In this case, it may be determined that the first adjustment amount is 5 V−4 V=1 V.

Step S1410: Decrease the data voltage for the currently detected pixel circuit by the first adjustment amount, to obtain an updated data voltage for the currently detected pixel circuit.

If the detected data of the currently detected pixel circuit is greater than the upper limit value of the standard detected data range, it indicates that the data voltage inputted to the currently detected pixel circuit is high. Therefore, after the first adjustment amount is determined, the data voltage for the currently detected pixel circuit is decreased by the first adjustment amount, to obtain a lower data voltage, and the lower data voltage is used as the updated data voltage for the currently detected pixel circuit. For example, the data voltage is originally 2 V, and is decreased by 1 V to be updated to 1 V.

Step S1420: If the detected data of the currently detected pixel circuit is less than the lower limit value of the standard detected data range, determine a second adjustment amount based on a difference between the detected data of the currently detected pixel circuit and the lower limit value of the standard detected data range.

If the detected data of the currently detected pixel circuit is less than the lower limit value of the standard detected data range, it indicates that the detected data is beyond the standard detected data range and the detected data is overly small, and therefore the second adjustment amount is determined. For example, the detected data of the currently detected pixel circuit is 1 V, and the standard detected data range is 2 V to 4 V. In this case, it may be determined that the first adjustment amount is 2 V−1 V=1 V.

Step S1430: Increase the data voltage for the currently detected pixel circuit by the second adjustment amount, to obtain an updated data voltage for the currently detected pixel circuit.

If the detected data of the currently detected pixel circuit is less than the lower limit value of the standard detected data range, it indicates that the data voltage inputted to the currently detected pixel circuit is low. Therefore, after the second adjustment amount is determined, the data voltage for the currently detected pixel circuit is increased by the second adjustment amount, to obtain a higher data voltage, and the higher data voltage is used as the updated data voltage for the currently detected pixel circuit. For example, the data voltage is originally 2 V, and is increased by 1 V to be updated to 3 V.

In this embodiment, the data voltage is decreased if the detected data of the currently detected pixel circuit is greater than the upper limit value of the standard detected data range, or the data voltage is increased if the detected data of the currently detected pixel circuit is less than the lower limit value of the standard detected data range, until the detected data of the currently detected pixel circuit is within the standard detected data range. Therefore, adjustment of the detected data of the currently detected pixel circuit is implemented.

Figure 15:
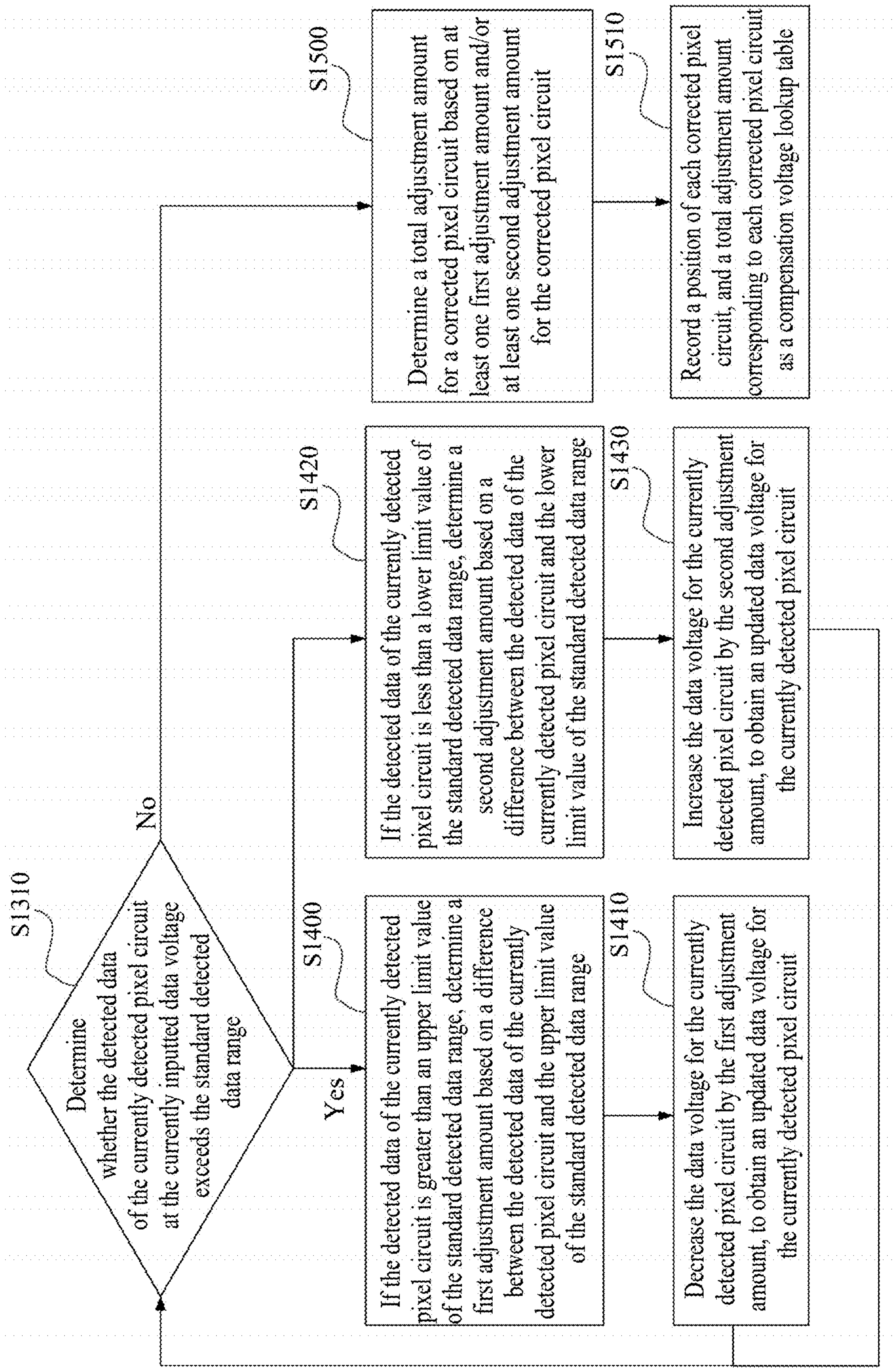
FIG. 15 is a schematic flowchart of a method for adjusting a data voltage according to still another embodiment.

In an embodiment, as shown in FIG. 15, the debugging method for a display panel further includes step S1500 and step S1510.

Step S1500: Determine a total adjustment amount for a corrected pixel circuit based on at least one first adjustment amount and/or at least one second adjustment amount for the corrected pixel circuit.

The corrected pixel circuit is a pixel circuit in which detected data of the currently detected pixel circuit obtained after adjustment of the data voltage is within the standard detected data range.

When the corrected pixel circuit is adjusted, the corrected pixel circuit may not be adjusted adequately at one time, that is, there may be a plurality of first adjustment amounts and/or a plurality of second adjustment amounts. For example, a second adjustment amount for first adjustment is +0.015 V, but detected data of the pixel circuit is still less than the lower limit value of the standard detected data range after the adjustment. In this case, a second adjustment amount for second adjustment is +0.006 V. If detected data of the pixel circuit is still less than the lower limit value of the standard detected data range, a second adjustment amount for third adjustment is +0.003 V. If detected data of the pixel circuit is still less than the lower limit value of the standard detected data range, a second adjustment amount for fourth adjustment is +0.001 V. In this case, the total adjustment amount is:

$$0.015\ \text{V}+0.006\ \text{V}+0.003\ \text{V}+0.001\ \text{V}=0.025\ \text{V}.$$

Step S1510: Record a position of each corrected pixel circuit, and a total adjustment amount corresponding to each corrected pixel circuit as a compensation voltage lookup table.

After the total adjustment amount corresponding to each corrected pixel circuit is determined, a mapping relationship between the position of each corrected pixel circuit and the corresponding total adjustment amount is recorded, so that the compensation voltage lookup table of the display panel may be obtained. When data voltages for pixel circuits of the display panel need to be adjusted subsequently, a total adjustment amount for a data voltage corresponding to each pixel circuit may be determined directly by looking up the compensation voltage lookup table.

It should be noted that the total adjustment amount mentioned in this embodiment is for adjustment on the basis of the data voltage corresponding to each pixel circuit when the data voltage inputted to each target color pixel circuit in the target pixel column is adjusted by using the method in the above embodiments, so that preset voltages of the plurality of target color pixel circuits are the same.

For example, a first node voltage is 0.89 V, and a second node voltage is 0.91 V. In this case, a voltage difference is 0.91−0.89=0.02 V. If there are 11 pixel circuits of the same color in a pixel column, a voltage step is 0.02/10=0.002 V. Assuming that a data voltage corresponding to a pixel circuit numbered 1 is set to 1.49 V, a data voltage corresponding to a pixel circuit numbered 2 is 1.492 V, a data voltage corresponding to a pixel circuit numbered 3 is 1.494 V, . . . , and a data voltage corresponding to a pixel circuit numbered 11 is 1.51 V. Then, it is determined that a total adjustment amount corresponding to the pixel circuit numbered 1 is 0.025 V, and, the data voltage 1.49 V set for the pixel circuit numbered 1 is adjusted by 0.025 V during compensation adjustment. A total adjustment amount corresponding to the pixel circuit numbered 11 is 0.027 V, and the data voltage 1.51 V set for the pixel circuit numbered 11 is adjusted by 0.027 V during compensation adjustment. First, it is necessary to ensure that the preset voltages of the plurality of target color pixel circuits are the same, and then adjustment is performed on the basis of the data voltage inputted to each pixel circuit, so that the detected data of each pixel circuit is within the standard detected data range.

In this embodiment, the total adjustment amount corresponding to each corrected pixel circuit is determined, and then the mapping relationship between the position of each corrected pixel circuit and the corresponding total adjustment amount is recorded, so that the compensation voltage lookup table of the display panel may be obtained. When the data voltages for the pixel circuits of the display panel need to be adjusted subsequently, the total adjustment amount for the data voltage corresponding to each pixel circuit may be determined directly by looking up the compensation voltage lookup table. This can ensure that the detected data of all the pixel circuits is within the standard detected data range after the pixel circuits are compensated using the corresponding total adjustment amount, thereby improving the uniformity of the display panel.

Figure 16:
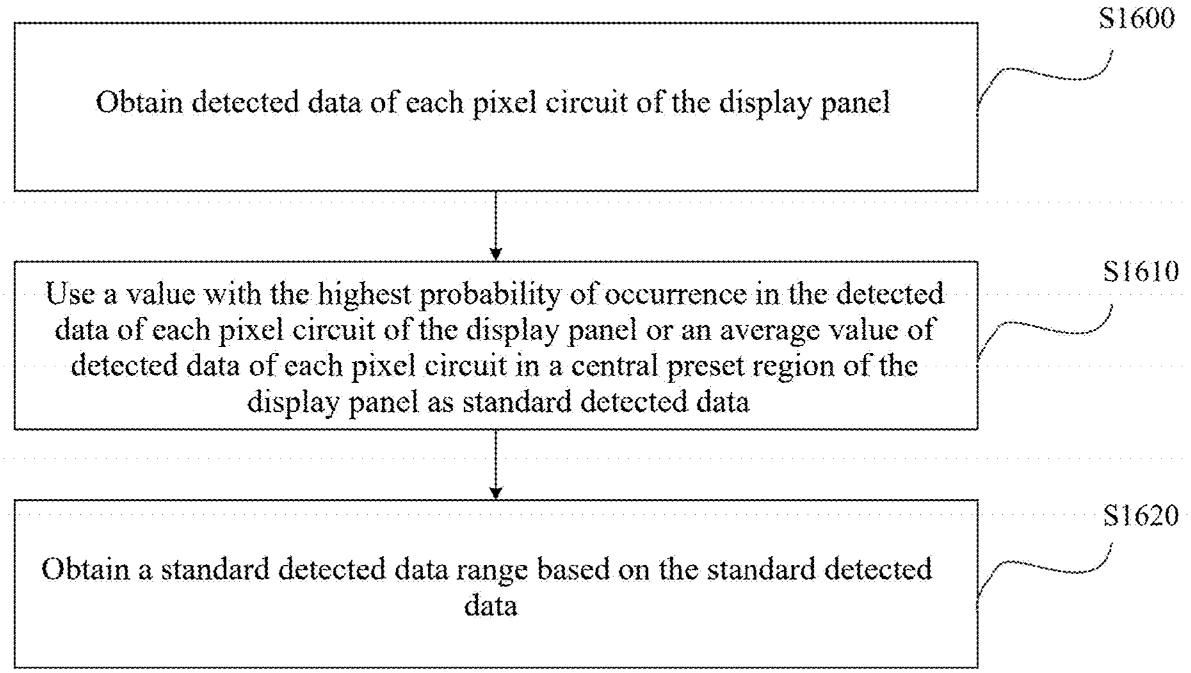
FIG. 16 is a schematic flowchart of a method for determining a standard detected data range according to an embodiment.

In an embodiment, as shown in FIG. 16, the detection method for a display panel further includes steps S1600 to S1620.

Step S1600: Obtain detected data of each pixel circuit of the display panel.

Each pixel circuit of the display panel may be directly detected to obtain the detected data of each pixel circuit.

Step S1610: Use a value with the highest probability of occurrence in the detected data of each pixel circuit of the display panel or an average value of detected data of each pixel circuit in a central preset region of the display panel as standard detected data.

Step S1620: Obtain the standard detected data range based on the standard detected data.

A range from the standard detected data plus a specific value to the standard detected data minus the specific value is the standard detected data range.

The detected data includes a detected voltage outputted by the detection module, and the detected voltage is related to a drive current of the currently detected pixel circuit at the preset voltage.

In this embodiment, the value with the highest probability of occurrence in the detected data of each pixel circuit of the display panel or the average value of the detected data of each pixel circuit in the central preset region of the display panel is used as the standard detected data, so that detected data that can best represent a display status of the display panel is used as the standard detected data, which provides a reference basis for subsequent adjustment.

Figure 17:
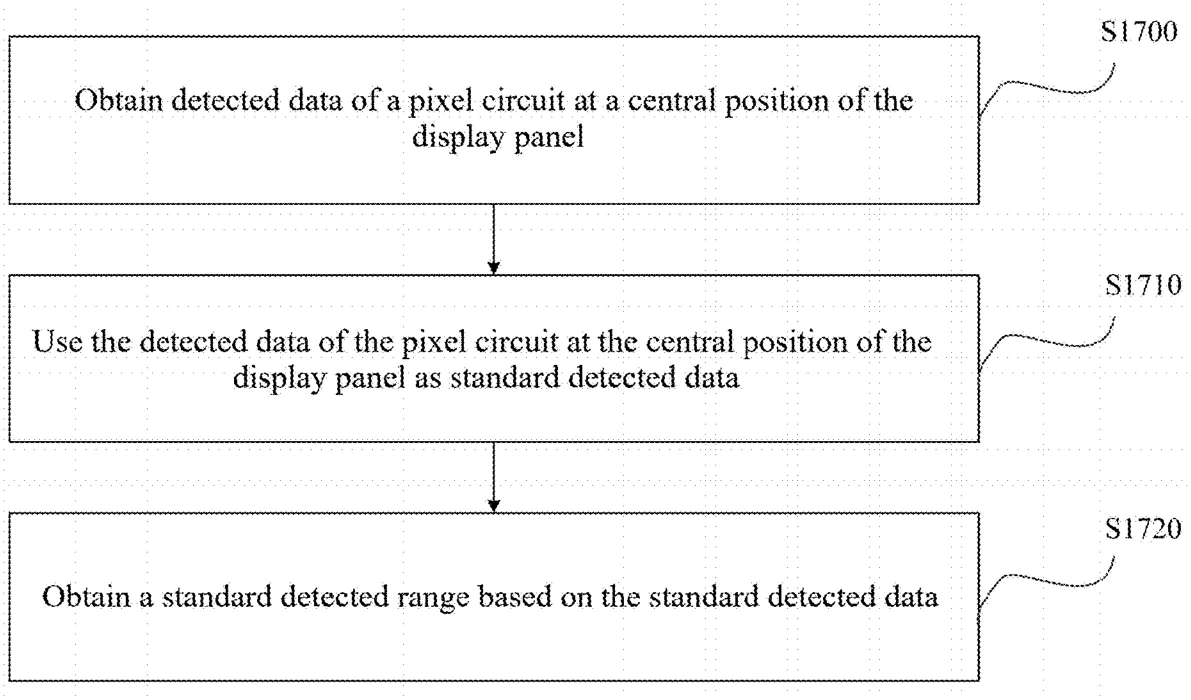
FIG. 17 is a schematic flowchart of a method for determining a standard detected data range according to another embodiment.

In an embodiment, as shown in FIG. 17, the detection method for a display panel further includes step S1700 to step S1720.

Step S1700: Obtain detected data of a pixel circuit at a central position of the display panel.

Step S1710: Use the detected data of the pixel circuit at the central position of the display panel as standard detected data.

Step S1720: Obtain the standard detected range based on the standard detected data.

In this embodiment, the detected data of the pixel circuit at the central position of the display panel is used as the standard detected data, so that detected data that can best represent a display status of the display panel is used as the standard detected data, which provides a reference basis for subsequent adjustment, where the central position of the display panel is a central region for gamma debugging.

It should be understood that although the steps in the flowcharts in FIG. 1, FIG. 3 to FIG. 5, FIG. 8, FIG. 10, and FIG. 13 to FIG. 17 are displayed in succession as indicated by arrows, these steps are not necessarily performed in succession in the order indicated by the arrows. Unless explicitly described herein, the execution of these steps is not limited to a strict order, instead, the steps may be performed in another order. In addition, at least some steps in FIG. 1, FIG. 3 to FIG. 5, FIG. 8, FIG. 10, and FIG. 13 to FIG. 17 may include a plurality of steps or stages. These steps or stages are not necessarily performed at the same time, but may be performed at different moments. These steps or stages are not necessarily performed in succession, but may be performed in turn or alternately with other steps or at least some steps or stages in other steps.

Figure 18:
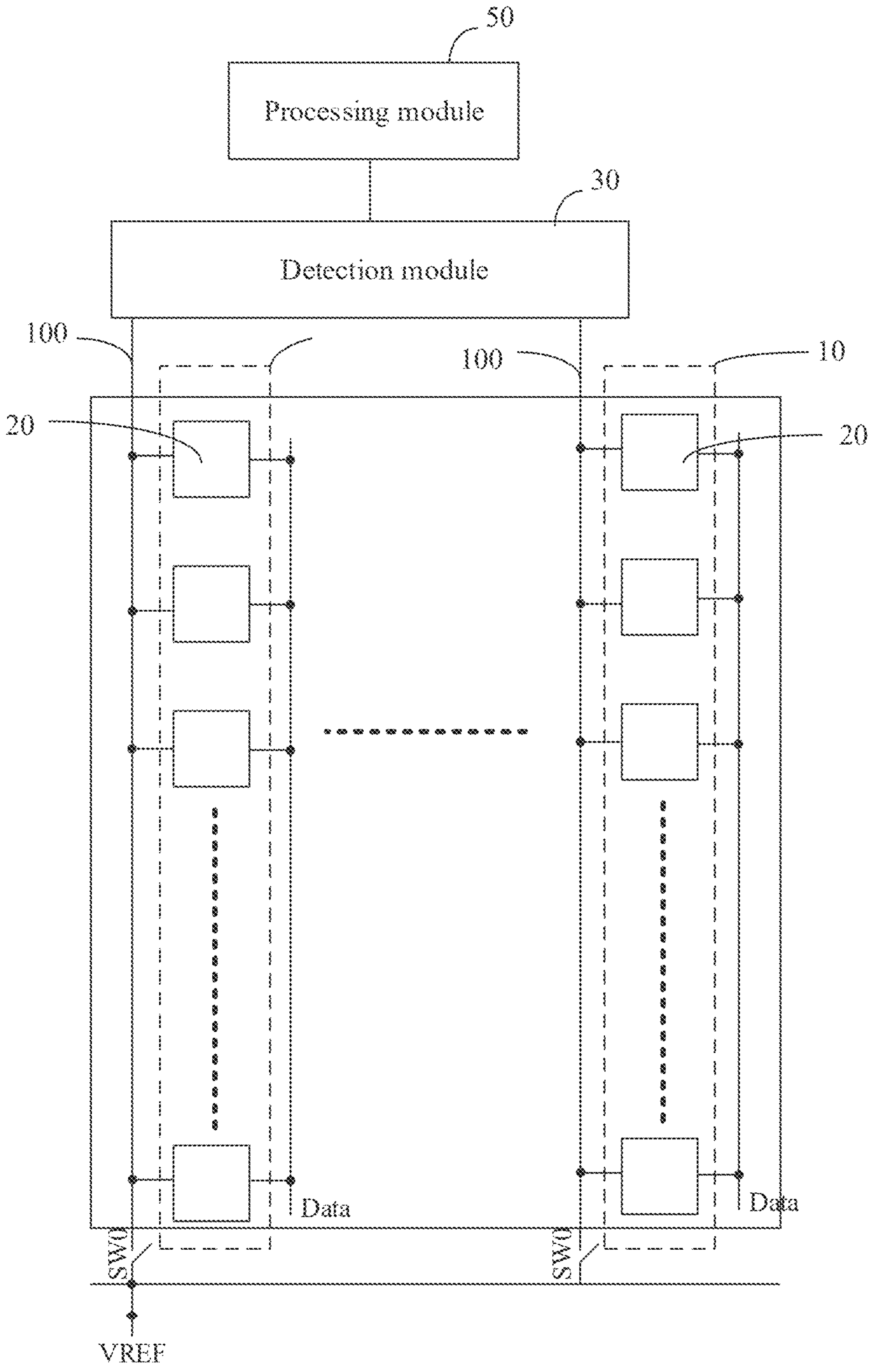
FIG. 18 is a schematic diagram of a structure of a display panel according to an embodiment.

In an embodiment, as shown in FIG. 18, there is provided a display panel, including: a plurality of pixel columns, each pixel column including a plurality of pixel circuits; a detection module; and a processing module, where a plurality of pixel circuits in a same column are connected to the detection module through a same detection signal line, and the processing module is connected to the pixel circuits and the detection module (connecting lines between the processing module and the pixel circuits are not shown).

The processing module is configured to: obtain a first node voltage and a second node voltage in a target pixel column, where the first node voltage is a voltage at a connection node between a pixel circuit in the target pixel column that is farthest from the detection module and a detection signal line, and the second node voltage is a voltage at a connection node between the pixel circuit in the target pixel column that is closest to the detection module and the detection signal line; adjust, based on the first node voltage and the second node voltage, a data voltage inputted to each target color pixel circuit in the target pixel column, so that preset voltages of a plurality of target color pixel circuits are the same, where the preset voltage is a difference between the data voltage inputted to the target color pixel circuit and a voltage at a connection node between the target color pixel circuit and the detection signal line; and detect the plurality of target color pixel circuits in the target pixel column, to obtain detected data of each target color pixel circuit.

In this embodiment, the display panel includes the plurality of pixel columns, each pixel column including the plurality of pixel circuits, and the plurality of pixel circuits in the same column being connected to the detection module through the same detection signal line. The processing module is connected to each pixel circuit and the detection module. The processing module first obtains the first node voltage and the second node voltage corresponding to the target color pixel circuits in the target pixel column, where the first node voltage is the voltage at the connection node between the target color pixel circuit in the target pixel column that is farthest from the detection module and the detection signal line, and the second node voltage is the voltage at the connection node between the target color pixel circuit in the target pixel column that is closest to the detection module and the detection signal line. In this way, the first node voltage corresponding to the target color pixel circuit in the target pixel column to be detected that is farthest from the detection module and the second node voltage corresponding to the target color pixel circuit in the target pixel column to be detected that is closest to the detection module are obtained. Because the detection signal line has line impedance, there is a voltage drop, caused by the line impedance, between the first node voltage and the second node voltage, and the voltage drop may lead to an inaccurate detection result. In this case, the data voltage inputted to each target color pixel circuit in the target pixel column is adjusted based on the first node voltage and the second node voltage, so that the preset voltages of the plurality of target color pixel circuits are the same, where the preset voltage is the difference between the data voltage inputted to the target color pixel circuit and the voltage at the connection node between the target color pixel circuit and the detection signal line. The data voltage inputted to each target color pixel circuit in the target pixel column is adjusted, so that the preset voltages are the same, solving the original problem of different preset voltages of the target color pixel circuits due to the voltage drop caused by the line impedance. Further, the preset voltages corresponding to the target color pixel circuits being the same ensures that each target color pixel circuit is in the same driving state. Then, the plurality of target color pixel circuits in the target pixel column are detected to obtain the detected data of each target color pixel circuit. In this case, because the detected data is obtained when each target color pixel circuit is in the same driving state, the obtained detected data of each target color pixel circuit is not affected by the voltage drop caused by the line impedance of the detection signal line, and can accurately represent a difference between characteristics of the target color pixel circuits that affect drive currents. This difference is affected by only the characteristic of the target color pixel circuit that affects the drive current, and is not affected by the voltage drop caused by the line impedance of the detection signal line. Therefore, a detection result is more accurate.

Figure 19:
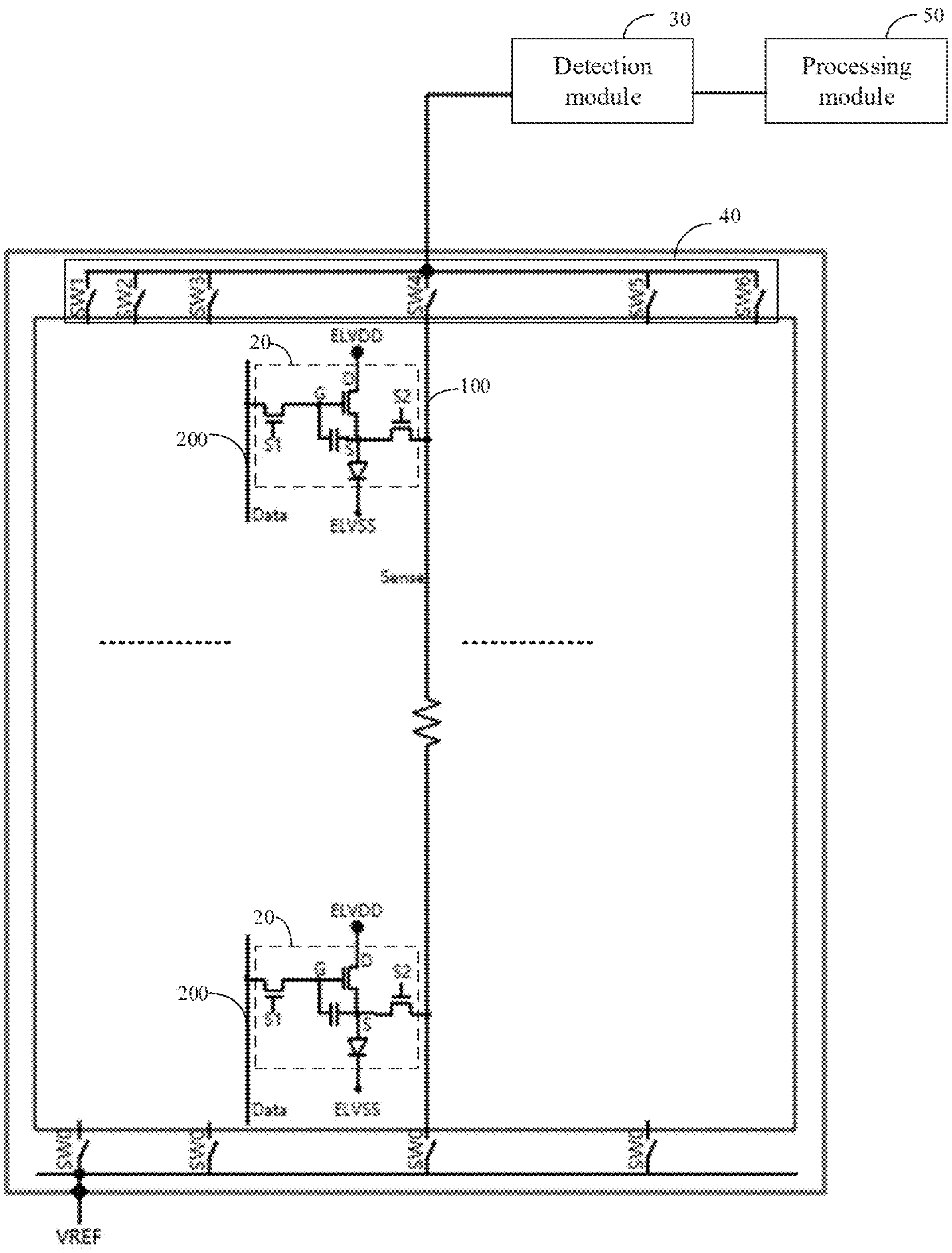
FIG. 19 is a second schematic diagram of a structure of a display panel according to an embodiment.

In an embodiment, as shown in FIG. 19, the display panel includes at least one gating module 40, the gating module 40 includes at least one gating switch SW, and each gating switch SW is arranged between a detection signal line 100 connected to a column of pixel circuits 20 and the detection module 30. The gating module 40 can sequentially turn on a plurality of gating switches SW that the gating module includes, to sequentially connect each detection signal line 100 to the detection module 30, so that the detection module 30 can detect each pixel circuit. A specific detection process has been described in the above embodiments, and details are not described again.

In this embodiment, the display panel includes the at least one gating module 40, so that the plurality of pixel columns can be sequentially detected.

Figure 20:
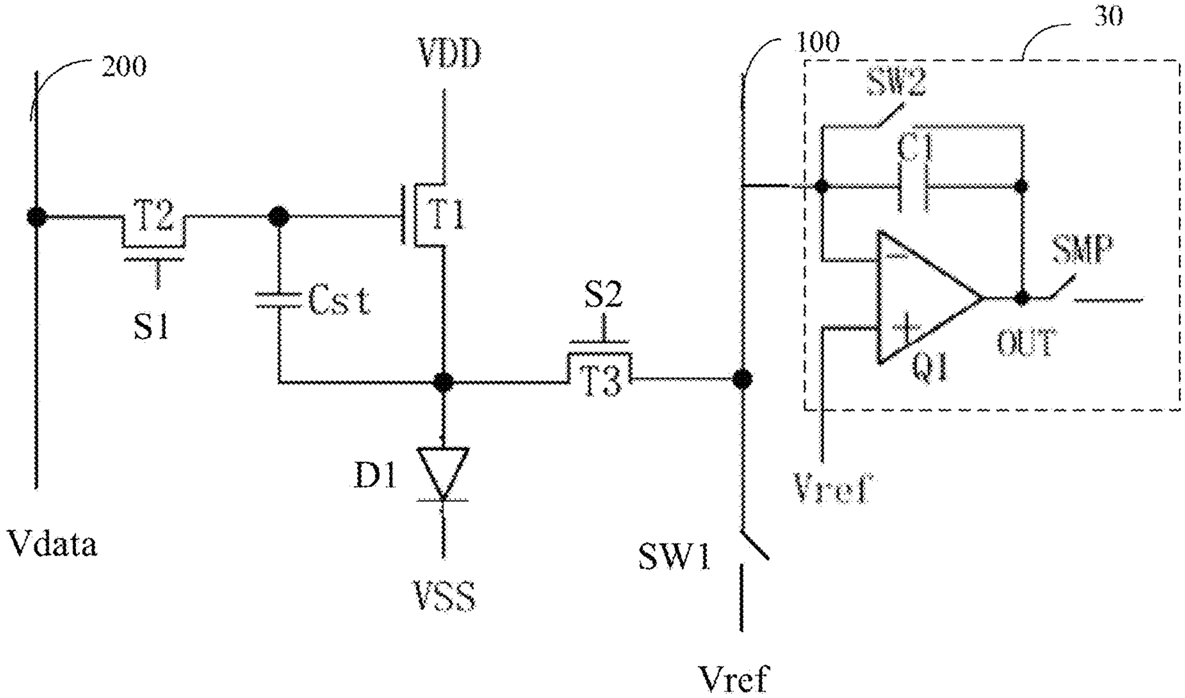
FIG. 20 is a schematic circuit diagram of a display panel according to an embodiment.

In an embodiment, as shown in FIG. 20, there is provided a schematic diagram of connecting a pixel circuit to the detection module 30, to illustrate a detection principle.

The pixel circuit includes a drive transistor T1, a second transistor T2, a third transistor T3, a light emitting element D1, and a storage capacitor Cst. A first terminal of the drive transistor T1 is electrically connected to a first power line VDD. A second terminal of the drive transistor T1 is separately electrically connected to a first terminal of the light emitting element D1 and a first terminal of the third transistor T3. A second terminal of the light emitting element D1 is electrically connected to a second power line VSS. A second terminal of the third transistor T3 is connected to the detection signal line 100. The second transistor T2 is configured to transmit a data voltage Vdata on a data signal line 200 to a gate of the drive transistor T1. After being turned on, the third transistor T3 transmits a voltage at the second terminal of the drive transistor T1 to the detection module 30 outside the pixel circuit through the detection signal line 100. The detection signal line further includes a switch SW1, and a reference signal Vref is inputted to the detection signal line via the switch SW1.

The detection module 30 includes a charging capacitor C1, an integrator Q1, a second switch SW2, and a sampling switch SMP. The reference voltage Vref is inputted to a first input terminal of the integrator Q1, and a second input terminal of the integrator Q1 is connected to the detection signal line 100. A first terminal of the charging capacitor C1 is connected to the second input terminal of the integrator Q1, and a second terminal of the charging capacitor C1 is connected to an output terminal OUT of the integrator Q1. A first terminal of the second switch SW2 is connected to the second input terminal of the integrator Q1, and a second terminal of the second switch SW2 is connected to the output terminal OUT of the integrator. The sampling switch SMP is connected to the output terminal OUT of the integrator Q1.

Figure 21:
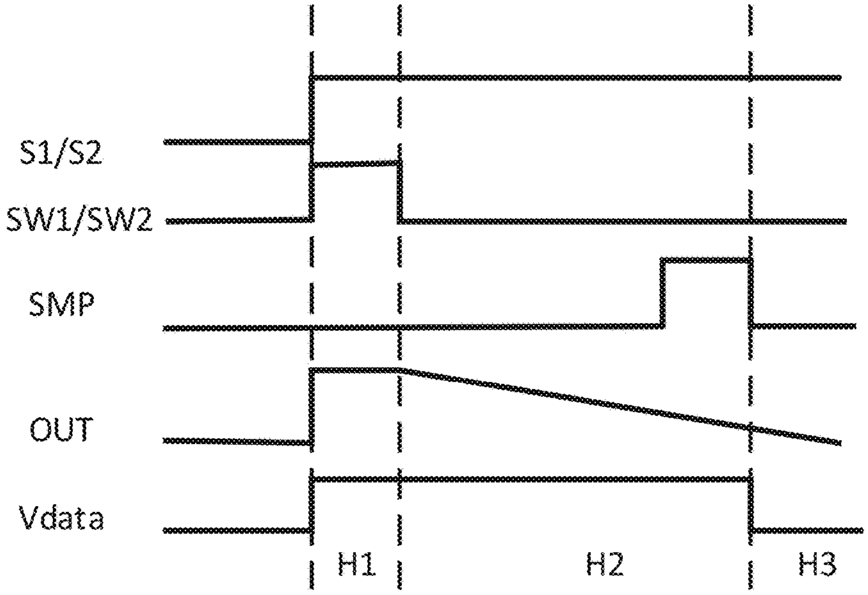
FIG. 21 is a circuit driving timing diagram of a display panel according to an embodiment.

FIG. 21 is a driving timing diagram provided for the above circuit.

At an initialization phase H1, a signal on a first scan line S1 is at a high level, controlling the transistor T2 to be turned on. The turned-on transistor T2 transmits, to the gate of the drive transistor T1, the data voltage Vdata transmitted on the data signal line 100. A signal inputted to a control terminal of the first switch SW1 and a signal on a second scan line S2 are both at a high level, controlling the third transistor T3 and the first switch SW1 to be turned on. The turned-on first switch SW1 and third transistor T3 transmit the reference voltage Vref to the first terminal of the drive transistor T1. The drive transistor T1 generates a drive current based on the data voltage Vdata.

A signal inputted to a control terminal of the second switch SW2 is at a high level, controlling the second switch SW2 to be turned on. The turned-on second switch SW2 resets the output terminal OUT of the integrator Q1, to reset a voltage at the output terminal OUT of the integrator Q1 to the reference voltage Vref. The reference voltage Vref is lower than a turning-on voltage of the light emitting element D1, so that the light emitting element D1 is prevented from being mistakenly turned on.

At a charging phase H2, a signal on the first scan line S1 is at a high level, controlling the transistor T2 to be turned on, to continue to write the data voltage Vdata into the gate of the drive transistor T1. Signals inputted to the control terminals of the first switch SW1 and the second control switch SW2 both become at a low level, controlling the first switch SW1 and the second switch SW2 to be turned off. Due to a "virtual short" characteristic of the integrator Q1, a potential at the first input terminal of the integrator Q1 is equal to a potential at the second input terminal of the integrator Q1. Therefore, the potential at the second input terminal of the integrator Q1 is equal to the reference voltage Vref, and the second input terminal of the integrator Q1 is connected to the second terminal of the third transistor T3 through the detection signal line 100. The reference voltage Vref is transmitted to a potential at the first terminal of the drive transistor T1 through the integrator Q1, the detection signal line 100, and the third transistor T3, so that the magnitude of the drive current generated by the drive transistor T1 remains unchanged during the charging phase H2. A first power source ELVDD charges the charging capacitor C1, and the voltage at the output terminal OUT of the integrator Q1 changes linearly with time.

At a sampling phase H3, a signal inputted to a control terminal of the sampling switch SMP becomes at a low level, controlling the sampling switch SMP to be turned off. A voltage is sampled at a falling edge of the sampling switch SMP, and the falling edge of the sampling switch SMP may be regarded as sampling end time, so that sampling time of the detected data may be determined. A voltage, sampled at the falling edge of the sampling switch SMP, at the output terminal OUT of the integrator Q1 is the detected data. The signal inputted to the control terminal of the sampling switch SMP may remain at a high level during the initialization phase H1 and the charging phase H2, or may become at a high level only at the end of the charging phase H2, to maintain sensitivity of the sampling switch SMP.

In a process of charging the charging capacitor C1 with the drive current, a charge of the charging capacitor C1 is Q1=C*V1, and the charge of the charging capacitor C1 also satisfies Q1=I1*t1. According to the above two formulas, a correspondence between the drive current and the detected data may be obtained, that is:

$$I_1 = \frac{C * (V_{ref} - V_1)}{t_1}$$

$I_1$ is a drive current of a currently detected pixel circuit, C is a capacitance value of the charging capacitor C1, V1 is detected data OUT, Vref is the reference voltage, and t1 is duration of the charging phase H2. The duration of the charging stage H2 is the sampling time.

A drive current I of a pixel circuit needs to be consistent, to ensure the uniformity of the display panel in light emission. The above formula shows that the drive current is negatively correlated with the detected data. A data voltage for each pixel circuit is determined based on whether the detected data obtained by the detection module meets a standard detected data range, without a need for internal compensation of the pixel circuit, reducing the area of the pixel circuit and ensuring display effects.

In this embodiment, a specific circuit diagram of the pixel circuit and the detection module is provided, to implement a function of detecting the pixel circuit.

Figure 22:
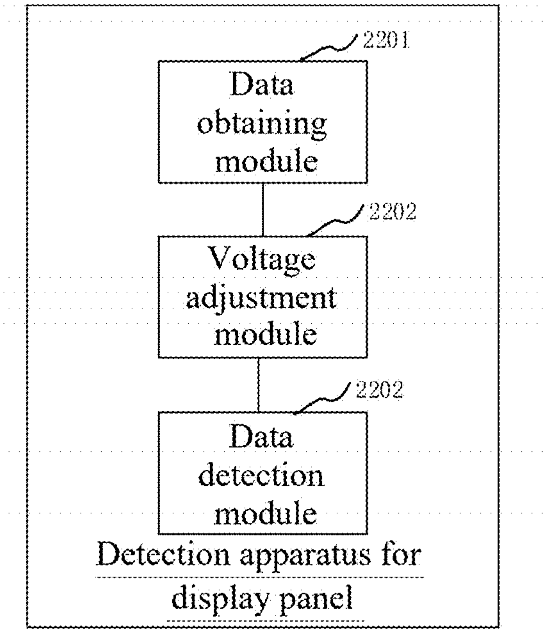
FIG. 22 is a schematic diagram of a structure of a detection apparatus for a display panel according to an embodiment.

In an embodiment, as shown in FIG. 22, there is provided a detection apparatus for a display panel. The apparatus includes a data obtaining module 2201, a voltage adjustment module 2202, and a data detection module 2203.

The data obtaining module 2201 is configured to obtain a first node voltage and a second node voltage in a target pixel column, where the first node voltage is a voltage at a connection node between a target color pixel circuit in the target pixel column that is farthest from the detection module and a detection signal line, and the second node voltage is a voltage at a connection node between a target color pixel circuit in the target pixel column that is closest to the detection module and the detection signal line.

The voltage adjustment module 2202 is configured to adjust, based on the first node voltage and the second node voltage, a data voltage inputted to each target color pixel circuit in the target pixel column, so that the same preset voltages of a plurality of target color pixel circuits are the same, where the preset voltage is a difference between the data voltage inputted to the target color pixel circuit and a voltage at a connection node between the target color pixel circuit and the detection signal line.

The data detection module 2203 is configured to detect the plurality of target color pixel circuits in the target pixel column, to obtain detected data of each target color pixel circuit.

In an embodiment, the voltage adjustment module 2202 includes a voltage difference determining unit, a step determining unit, a reference voltage obtaining unit, and an adjustment unit.

The voltage difference determining unit is configured to determine a voltage difference based on the first node voltage and the second node voltage.

The step determining unit is configured to determine a voltage step based on the voltage difference and a number of the target color pixel circuits in the target pixel column.

The reference voltage obtaining unit is configured to obtain a reference data voltage corresponding to a reference pixel circuit of a target color in the target pixel column.

The adjustment unit is configured to adjust the reference data voltage by at least one voltage step based on a position of a currently detected pixel circuit relative to the reference pixel circuit in the target pixel column, to obtain a data voltage for the currently detected pixel circuit.

In an embodiment, the voltage adjustment module 2202 includes a position determining unit, a step adjustment unit, a first adjustment unit, and a second adjustment unit.

The position determining unit is configured to determine that the currently detected pixel circuit is an $i^{th}$ target color pixel circuit relative to the reference pixel circuit.

The step adjustment unit is configured to adjust the reference data voltage by i voltage steps for the currently detected pixel circuit, to determine the data voltage inputted to the currently detected pixel circuit, where $1 \le i \le n-1$, and n is the number of the target color pixel circuits in the target pixel column.

The first adjustment unit is configured to: when the currently detected pixel circuit is an $i^{th}$ target color pixel circuit on a side close to the detection module relative to the reference pixel circuit, decrease the reference data voltage by i voltage steps, to obtain the data voltage for the currently detected pixel circuit.

The second adjustment unit is configured to: when the currently detected pixel circuit is an $i^{th}$ target color pixel circuit arranged on a side away from the detection module relative to the reference pixel circuit, increase the reference data voltage by i voltage steps, to obtain the data voltage for the currently detected pixel circuit.

In an embodiment, the detection apparatus for a display panel further includes a first detection module, a second detection module, and a coefficient determining module.

The first detection module is configured to separately detect a plurality of test circuits under a first preset condition, to obtain a plurality of pieces of first test data, where the first preset condition includes controlling currents outputted by the plurality of test circuits to be greater than a preset value.

The second detection module is configured to separately detect the plurality of test circuits under a second preset condition, to obtain a plurality of pieces of second test data, where the second preset condition includes controlling the currents outputted by the plurality of test circuits to be less than or equal to the preset value.

The coefficient determining module is configured to determine a preset conversion coefficient based on the plurality of pieces of first test data and the plurality of pieces of second test data.

In an embodiment, the data detection module 2203 includes a first resetting unit, a second resetting unit, a detection unit, and a cyclic detection unit.

The first resetting unit is configured to reset all the target color pixel circuits in the target pixel column before the plurality of target color pixel circuits in the target pixel column are detected.

The second resetting unit is configured to reset the plurality of target color pixel circuits in the target pixel column after detected data of the plurality of target color pixel circuits in the target pixel column is obtained.

The detection unit is configured to turn on a gating switch corresponding to the target pixel column, and sequentially detect the pixel circuits in the target pixel column, to obtain the detected data of each pixel circuit.

The cyclic detection unit is configured to use a column where a column of pixel circuits that has not been detected is located on the display panel as a new target pixel column after all the pixel circuits in the target pixel column are detected, and perform the step of turning on a gating switch corresponding to the target pixel column, and sequentially detecting the pixel circuits in the target pixel column, to obtain the detected data of each pixel circuit, until all columns of pixel circuits on the display panel have been detected.

In an embodiment, the detection apparatus for a display panel further includes a determining module and an adjustment module.

The determining module is configured to determine whether detected data of the currently detected pixel circuit at a currently inputted data voltage exceeds a standard detected data range.

The adjustment module is configured to adjust, at least once if the detected data of the currently detected pixel circuit exceeds the standard detected data range, a data voltage inputted to the currently detected pixel circuit, until the detected data of the currently detected pixel circuit is within the standard detected data range.

In an embodiment, the adjustment module includes a first adjustment determining unit, a first update unit, a second adjustment determining unit, and a second update unit.

The first adjustment determining unit is configured to: if the detected data of the currently detected pixel circuit is greater than an upper limit value of the standard detected data range, determine a first adjustment amount based on a difference between the detected data of the currently detected pixel circuit and the upper limit value of the standard detected data range.

The first update unit is configured to decrease the data voltage for the currently detected pixel circuit by the first adjustment amount, to obtain an updated data voltage for the currently detected pixel circuit.

The second adjustment determining unit is configured to: if the detected data of the currently detected pixel circuit is less than a lower limit value of the standard detected data range, determine a second adjustment amount based on a difference between the detected data of the currently detected pixel circuit and the lower limit value of the standard detected data range.

The second update unit is configured to increase the data voltage for the currently detected pixel circuit by the second adjustment amount, to obtain an updated data voltage for the currently detected pixel circuit.

In an embodiment, the detection apparatus for a display panel further includes a total adjustment amount determining module and a lookup table determining module.

The total adjustment amount determining module is configured to determine a total adjustment amount for a corrected pixel circuit based on at least one first adjustment amount and/or at least one second adjustment amount for the corrected pixel circuit, where the corrected pixel circuit is a pixel circuit in which detected data obtained after adjustment of the data voltage is within the standard detected data range.

The lookup table determining module is configured to record a position of each corrected pixel circuit, and a total adjustment amount corresponding to each corrected pixel circuit as a compensation voltage lookup table.

For specific definitions on the detection apparatus for a display panel, reference may be made to the definitions on the detection method for a display panel above, and details are not described herein again. All or some of the modules in the foregoing detection apparatus for a display panel may be implemented by software, hardware, or a combination thereof. The modules may be embedded in or independent of a processor of a computer device in the form of hardware, or may be stored in a memory of a computer device in the form of software, so that the processor can invoke the modules to perform operations corresponding to the modules. It should be noted that module division in this embodiment of this application is an example and is merely logical function division. During actual implementation, there may be another division manner.

Figure 23:
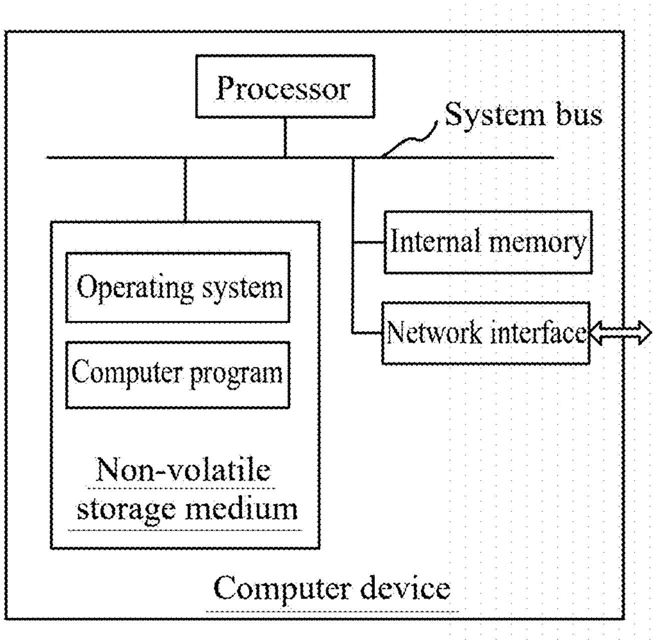
FIG. 23 is a diagram of an internal structure of a computer device according to an embodiment.

In an embodiment, there is provided a computer device. A diagram of an internal structure of the computer device may be as shown in FIG. 23. The computer device includes a processor, a memory, and a network interface that are connected via a system bus. The processor of the computer device is for providing computing and control capabilities. The memory of the computer device includes a non-volatile storage medium and an internal memory. The non-volatile storage medium stores an operating system, a computer program, and a database. The internal memory provides a running environment for the operating system and the computer program in the non-volatile storage medium. The network interface of the computer device is for communicating with an external terminal via a network connection. When the computer program is executed by the processor, a detection method for a display panel is implemented.

Those skilled in the art can understand that the structure shown in FIG. 23 is merely a block diagram of a part of the structure related to the solutions of the present application, and does not constitute a limitation on the computer device to which the solutions of the present application are applied. Specifically, the computer device may include more or fewer components than those shown in the figure, some components are combined, or a different component arrangement is used.

In an embodiment, there is provided a computer device, including a memory and a processor, where the memory stores a computer program, and when the processor executes the computer program, the steps in the above method embodiments are implemented.

In an embodiment, there is provided a computer-readable storage medium having stored thereon a computer program, where when the computer program is executed by a processor, the steps in the above method embodiments are implemented.

In an embodiment, there is provided a computer program product, including a computer program, where when the computer program is executed by a processor, the steps in the above method embodiments are implemented.

Those of ordinary skill in the art can understand that all or part of the processes in the methods in the above embodiments may be implemented by a computer program by instructing related hardware. The computer program may be stored in a non-volatile computer-readable storage medium, and when the computer program is executed, the processes in the above method embodiments may be included. Any reference to the memory, storage, the database or other media used in the embodiments provided in the present application may include at least one of a non-volatile memory and a volatile memory. The non-volatile memory may include a read-only memory (ROM), a magnetic tape, a floppy disk, a flash memory, an optical memory, etc. The volatile memory may include a random access memory (RAM) or an external cache memory. As an illustration and not a limitation, the RAM may be in various forms, such as a static random access memory (SRAM) or a dynamic random access memory (DRAM).

In the description of the this description, the description with reference to the terms such as “some embodiments”, “other embodiments”, and “ideal embodiments” means that specific features, structures, materials, or characteristics described with respect to the embodiments or examples are included in at least one embodiment or example of the present application. In this description, the schematic descriptions of the above terms do not necessarily refer to the same embodiments or examples.

The technical features in the above embodiments may be combined in any manner. For the purpose of simplicity in description, not all possible combinations of the technical features in the above-described embodiments are described. However, as long as the combinations of these technical features do not conflict with each other, the combinations shall all fall within the scope of the description.

The above embodiments merely represent several implementations of the present application, giving specifics and details thereof, but should not be understood as limiting the scope of the present patent of invention thereby. It should be noted that those of ordinary skill in the art could also make several alterations and improvements without departing from the spirit of the present application and these would all fall within the scope of protection of the present application. Therefore, the scope of protection of the present patent application shall be in accordance with the appended claims.

What is claimed is:

1. A detection method for a display panel, wherein the display panel comprises;

a plurality of pixel columns, each of the plurality of pixel columns comprising a plurality of pixel circuits, and the plurality of pixel circuits in a same column being connected to a detection module through a same detection signal line, and the method comprises:

obtaining a first node voltage and a second node voltage in a target pixel column, wherein the first node voltage is a voltage at a connection node between a target color pixel circuit in the target pixel column that is farthest from the detection module and a detection signal line, and the second node voltage is a voltage at a connection node between the target color pixel circuit in the target pixel column that is closest to the detection module and the detection signal line;

adjusting, based on the first node voltage and the second node voltage, a data voltage inputted to each target color pixel circuit in the target pixel column, so that preset voltages of a plurality of target color pixel circuits are the same, wherein each of the preset voltages is a difference voltage between the data voltage inputted to the target color pixel circuit and a voltage at the connection node between the target color pixel circuit and the detection signal line; and detecting a data voltage for each of the plurality of target color pixel circuits in the target pixel column.

2. The detection method for the display panel according to claim 1, wherein the adjusting, based on the first node voltage and the second node voltage, the data voltage inputted to each target color pixel circuit in the target pixel column, so that each of the preset voltages of the plurality of target color pixel circuits are the same comprises:

determining a voltage difference based on the first node voltage and the second node voltage; determining a voltage step based on the voltage difference and a number of the plurality of target color pixel circuits in the target pixel column;

obtaining a reference data voltage corresponding to a reference pixel circuit of a target color in the target pixel column; and adjusting the reference data voltage by the voltage step at least one time based on a position of a currently detected pixel circuit relative to the reference pixel circuit in the target pixel column, to obtain a data voltage for the currently detected pixel circuit.

3. The detection method for the display panel according to claim 2, wherein the adjusting of the reference data voltage by the voltage step at least one time based on the position of the currently detected pixel circuit relative to the reference pixel circuit in the target pixel column, to obtain the data voltage for the currently detected pixel circuit comprises:

determining that the currently detected pixel circuit is an $i^{th}$ target color pixel circuit having an index value $i^{th}$ relative to the reference pixel circuit; and adjusting the voltage step $i^{th}$ times based on the reference data voltage for the currently detected pixel circuit, to determine the data voltage inputted to the currently detected pixel circuit, wherein $1 \le i \le n-1$, and wherein n is the number of the target color pixel circuits in the target pixel column.

4. The detection method for the display panel according to claim 3, wherein the adjusting of the reference data voltage by the voltage step at least one time based on the position of the currently detected pixel circuit relative to the reference pixel circuit in the target pixel column, to obtain the data voltage for the currently detected pixel circuit further comprises:

when the currently detected pixel circuit is an $i^{th}$ target color pixel circuit on a side close to the detection module relative to the reference pixel circuit, the reference data voltage is decreased by i voltage steps, to obtain the data voltage for the currently detected pixel circuit; or when the currently detected pixel circuit is an $i^{th}$ target color pixel circuit arranged on a side away from the detection module relative to the reference pixel circuit, the reference data voltage is increased by i voltage steps, to obtain the data voltage for the currently detected pixel circuit.

5. The detection method for the display panel according to claim 2, wherein the method further comprises: obtaining the detected data of each of the plurality of pixel circuits, and obtaining updated detected data of each of the plurality of pixel circuits based on the detected data of each of the plurality of pixel circuits, and a preset conversion coefficient.

6. The detection method for the display panel according to claim 5, wherein the method further comprises: obtaining the preset conversion coefficient according to a plurality of test circuits, wherein the obtaining of the preset conversion coefficient according to the plurality of test circuits comprises:

separately detecting each of the plurality of test circuits under a first preset condition, to obtain a plurality of pieces of first test data, wherein the first preset condition comprises controlling currents outputted by the plurality of test circuits to be greater than a preset value; separately detecting the plurality of test circuits under a second preset condition, to obtain a plurality of pieces of second test data, wherein the second preset condition comprises controlling the currents outputted by the plurality of test circuits to be less than or equal to the preset value; and determining the preset conversion coefficient based on a functional relationship between the plurality of pieces of first test data and the plurality of pieces of second test data.

7. The detection method for the display panel according to claim 1, wherein the plurality of pixel circuits comprises a drive transistor and a connection node disposed between a pixel circuit and the detection signal line; wherein the connection node is disposed between a target terminal of the drive transistor and the detection signal line, and a gate of the drive transistor is configured to receive the data voltage; and wherein the target terminal is a source or a drain of the drive transistor.

8. The detection method for the display panel according to claim 1, wherein the method further comprises: resetting all of the plurality of target color pixel circuits in the target pixel column before the plurality of target color pixel circuits in the target pixel column are detected; and resetting each of the plurality of target color pixel circuits in the target pixel column after the detected data of each of the plurality of target color pixel circuits in the target pixel column is obtained.

9. The detection method for the display panel according to claim 8, wherein the display panel comprises at least one gating module, the at least one gating module comprises at least one gating switch, and the at least one gating switch is arranged between a detection signal line connected to a column of pixel circuits and the detection module.

10. The detection method for the display panel according to claim 9, wherein the detecting of the plurality of pixel circuits in the target pixel column, to obtain detected data of each pixel circuit comprises:

turning on a gating switch corresponding to the target pixel column, and sequentially detecting the pixel circuits in the target pixel column, to obtain the detected data of each pixel circuit; and using a column where a column of pixel circuits that has not been detected is located on the display panel as a new target pixel column after all the pixel circuits in the target pixel column are detected, and returning to the step of turning on a gating switch corresponding to the target pixel column, and sequentially detecting the pixel circuits in the target pixel column, to obtain the detected data of each pixel circuit, until all columns of pixel circuits on the display panel have been detected.

11. The detection method for the display panel according to claim 10, wherein the detected data comprises a detected voltage outputted by the detection module, and the detected voltage is related to a drive current of a currently detected pixel circuit at the preset voltage.

12. A debugging method for the display panel, wherein the debugging method comprises: obtaining the detection data voltage for the currently detected pixel circuit in the target pixel column by using the detection method according to claim 1; determining whether the detected data of the currently detected pixel circuit at the detection data voltage exceeds a standard detected data range; and adjusting, at least once if the detected data of the currently detected pixel circuit exceeds the standard detected data range, a data voltage inputted to the currently detected pixel circuit, until the detected data of the currently detected pixel circuit is within the standard detected data range, and recording a position of the currently detected pixel circuit, and a total adjustment amount for the currently detected pixel circuit; or recording, if the detected data of the currently detected pixel circuit does not exceed the standard detected data range, a position of the currently detected pixel circuit, and recording an adjustment amount for the currently detected pixel circuit as zero.

13. The debugging method for the display panel according to claim 12, wherein the adjusting, at least once if the detected data of the currently detected pixel circuit exceeds the standard detected data range, the data voltage inputted to the currently detected pixel circuit comprises: determining whether the detected data of the currently detected pixel circuit is greater than an upper limit value of the standard detected data range, determining a first adjustment amount based on a difference between the detected data of the currently detected pixel circuit and the upper limit value of the standard detected data range; and decreasing the data voltage for the currently detected pixel circuit by the first adjustment amount, to obtain an updated data voltage for the currently detected pixel circuit; or determining whether the detected data of the currently detected pixel circuit is less than a lower limit value of the standard detected data range, determining a second adjustment amount based on a difference between the detected data of the currently detected pixel circuit and the lower limit value of the standard detected data range; and increasing the data voltage for the currently detected pixel circuit by the second adjustment amount, to obtain an updated data voltage for the currently detected pixel circuit.

14. The debugging method for the display panel according to claim 12, wherein the method further comprises: determining a total adjustment amount for a corrected pixel circuit based on at least one first adjustment amount and at least one second adjustment amount for the corrected pixel circuit, wherein the corrected pixel circuit is a pixel circuit in which detected data of the currently detected pixel circuit obtained after adjustment of the data voltage is within the standard detected data range; and recording a position of each corrected pixel circuit, and a total adjustment amount corresponding to each corrected pixel circuit as a compensation voltage lookup table.

15. The debugging method for the display panel according to claim 12, wherein the method further comprises: obtaining detected data of each pixel circuit of the display panel; using a value with the highest probability of occurrence in the detected data of each pixel circuit of the display panel or an average value of detected data of each pixel circuit in a central preset region of the display panel as standard detected data; and obtaining the standard detected data range based on the standard detected data.

16. The debugging method for the display panel according to claim 12, wherein the detected data comprises: a detected voltage outputted by the detection module, and the detected voltage is related to a drive current of the currently detected pixel circuit at the preset voltage.

* * * * *